(12) United States Patent
Sasaki et al.

(10) Patent No.: US 11,960,666 B2
(45) Date of Patent: Apr. 16, 2024

(54) ACOUSTIC DEVICE

(71) Applicant: AlphaTheta Corporation, Yokohama (JP)

(72) Inventors: Kenji Sasaki, Yokohama (JP); Syusuke Fujiwara, Yokohama (JP); Nao Takagi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 216 days.

(21) Appl. No.: 17/619,817

(22) PCT Filed: Jun. 19, 2019

(86) PCT No.: PCT/JP2019/024257
§ 371 (c)(1),
(2) Date: Dec. 16, 2021

(87) PCT Pub. No.: WO2020/255289
PCT Pub. Date: Dec. 24, 2020

(65) Prior Publication Data
US 2022/0350424 A1    Nov. 3, 2022

(51) Int. Cl.
*G06F 3/0362* (2013.01)
*G05G 1/10* (2006.01)
*G10H 1/32* (2006.01)

(52) U.S. Cl.
CPC ............ *G06F 3/0362* (2013.01); *G05G 1/10* (2013.01); *G10H 1/32* (2013.01); *G10H 2210/241* (2013.01)

(58) Field of Classification Search
CPC .......... G06F 3/165; G06F 3/0362; G06F 3/02; H03G 5/02; H03G 3/02

(Continued)

(56) References Cited

U.S. PATENT DOCUMENTS 6,396,419 B1 * 5/2002 Yeh .................. H01H 25/06
  341/16
7,986,798 B2 * 7/2011 Hsu ................. G06F 3/0362
  381/104

(Continued)

FOREIGN PATENT DOCUMENTS

JP   2013-182627   9/2013
JP   2015-114792   6/2015
WO   2006/103904   10/2006

OTHER PUBLICATIONS

International Preliminary Report on Patentability dated Dec. 21, 2021, 10 pages.

(Continued)

*Primary Examiner* — Disler Paul
(74) *Attorney, Agent, or Firm* — Rankin, Hill & Clark LLP

(57) ABSTRACT

An acoustic device includes a rotary operator and a base supporting the rotary operator so that the rotary operator is rotatable. The base includes a braking unit configured to be brought into contact with the rotary operator to cause a braking force to act on the rotary operator and an adjuster configured to adjust the braking force caused by the braking unit. The braking unit includes a plurality of contact members configured to be brought into contact with the rotary operator to cause the braking force to act on the rotary operator. The braking force acting on the rotary operator by the plurality of the contact members varies depending on an adjustment amount by the adjuster.

7 Claims, 17 Drawing Sheets

(58) Field of Classification Search
USPC ................. 381/118–119, 109; 463/35–36
See application file for complete search history.

(56) References Cited

U.S. PATENT DOCUMENTS

| | | | |
|---|---|---|---|
| 9,768,746 B2* | 9/2017 | Zalisk | ................. G06F 3/04847 |
| 10,649,719 B2* | 5/2020 | Anderson | .............. H04H 60/04 |
| 2012/0134513 A1 | 5/2012 | Garet et al. | |

OTHER PUBLICATIONS

International Search Report dated Aug. 13, 2019, Application No. PCT/JP2019/024257; English translation included 4 pages.

* cited by examiner

FIG.4
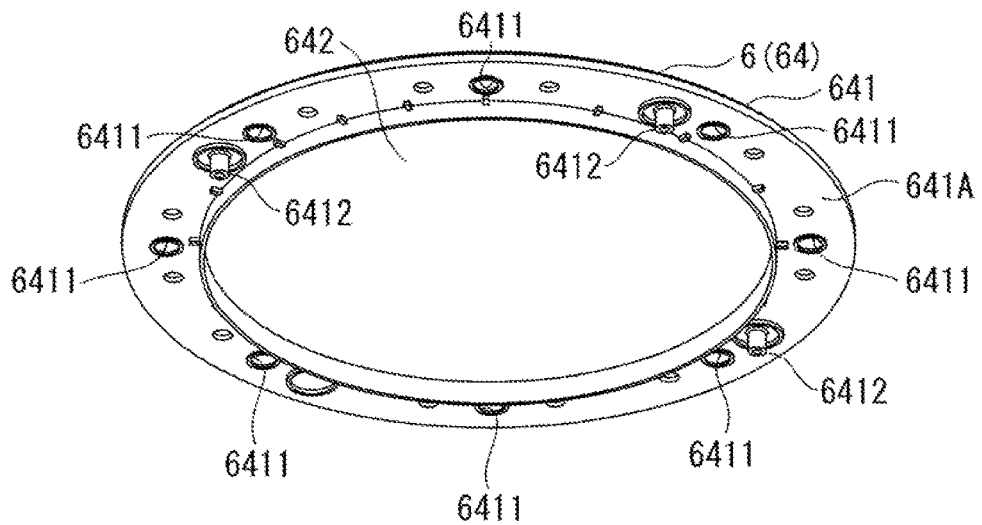
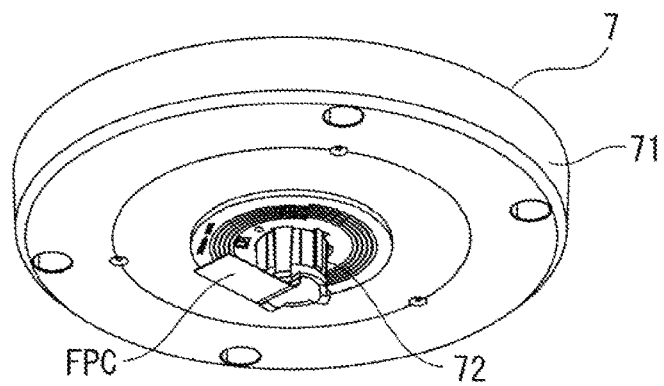
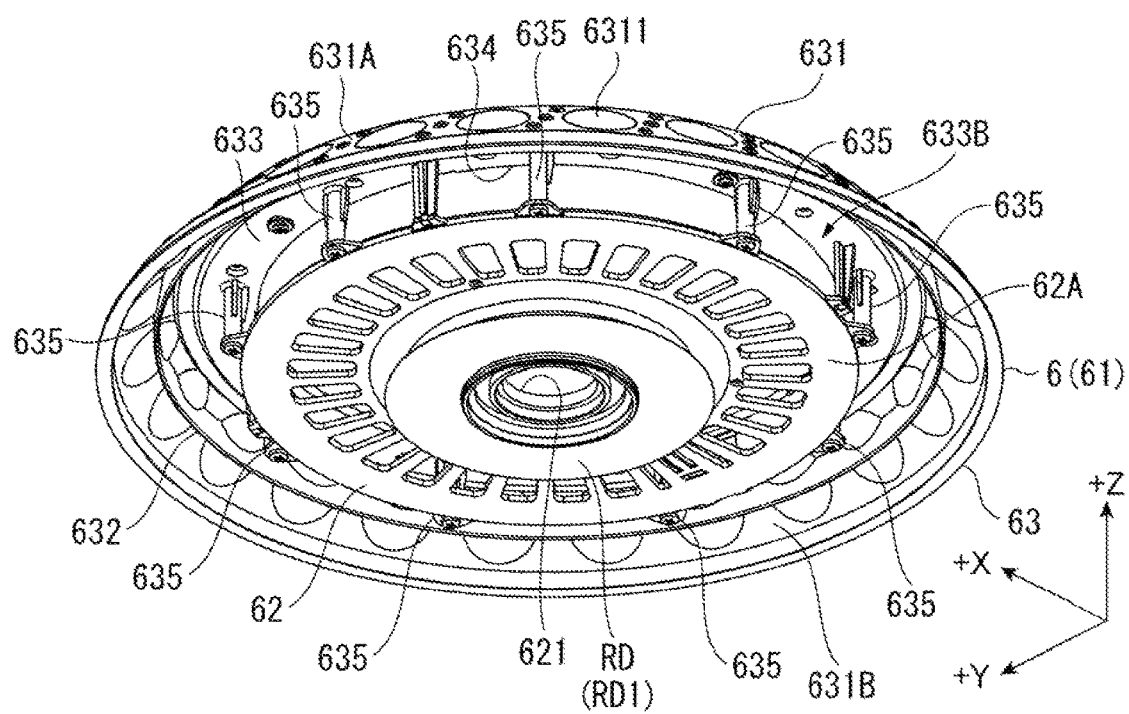

FIG.12
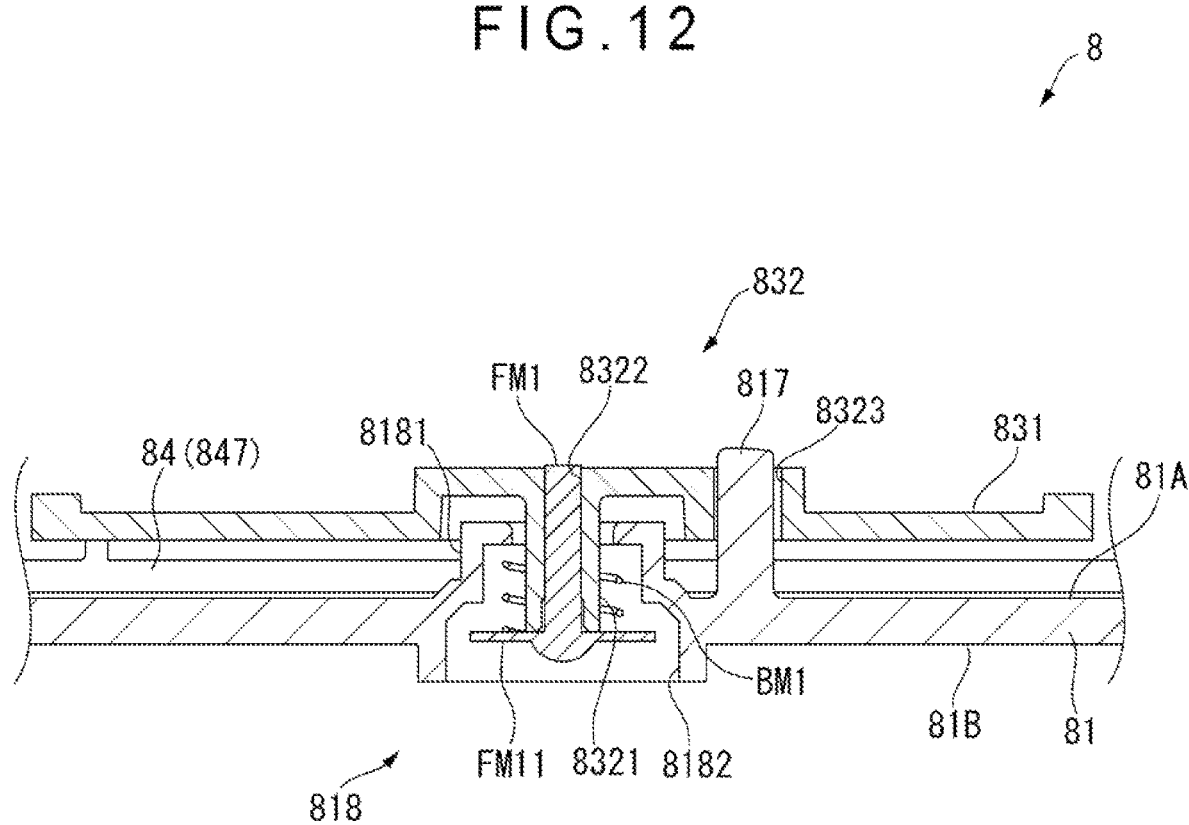
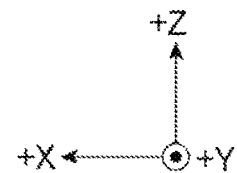

ACOUSTIC DEVICE

TECHNICAL FIELD

The present invention relates to an acoustic device.

BACKGROUND ART

There is conventionally known a jog dial unit including a jog dial operated by an operator (see, for instance, Patent Literature 1).

The jog dial unit described in Patent Literature 1 includes a jog dial, a base rotatably supporting the jog dial, a load applying unit for applying a braking load to the jog dial, and a load adjuster for adjusting the braking load.

The load adjuster adjusts the braking load applied to the jog dial according to an adjustment operation by an operator. Specifically, the load adjuster includes a plate cam and an adjustment operating unit. The plate cam is rotatably provided at a base end of a right holding lever of the load applying unit to expand and contract a coil spring interposed between an engagement piece of a left holding lever of the load applying unit and a spring receiving piece. The adjustment operating unit rotates the plate cam normally or reversely. Further, the adjustment operation unit includes a first gear coaxially fixed to the plate cam, a second gear configured to mesh with the first gear, and a load adjustment knob coaxially attached to the second gear via a shaft.

In the jog dial unit, the left holding lever and the right holding lever mutually pivot outward by a uniform spring force of the coil spring. Slide contact portions of the respective holding levers are in contact with a rotational shaft of the jog dial, and a holding force of the holding levers is adjusted by the expandable/contractable coil spring. Accordingly, a frictional force between the holding levers and the rotational shaft is adjusted by the normal/reverse rotating operation of the plate cam, thus adjusting the braking load applied to the jog dial.

Right rotation (clockwise rotation) of the load adjustment knob rotates the plate cam counterclockwise via the second gear and the first gear. Left rotation (counterclockwise rotation) of the load adjustment knob rotates the plate cam clockwise via the second gear and the first gear. Thus, rotating the load adjustment knob to the right increases the braking load applied to the jog dial, and rotating the load adjustment knob to the left reduces the braking load applied to the jog dial.

CITATION LIST

Patent Literature(s)

Patent Literature 1: JP 2015-114792 A

SUMMARY OF THE INVENTION

Problem(s) to be Solved by the Invention

The jog dial unit described in Patent Literature 1, however, is configured to apply a frictional load to the rotational shaft disposed at the center of the jog dial serving as a rotating body, thus making it difficult to provide a braking force desired by a player.

For the above reason, there has been a demand for any other configuration capable of adjusting the braking force applied to the jog dial.

An object of the invention is to solve at least a part of the above problem and to provide an acoustic device capable of adjusting a braking force applied to a rotary operator.

Means for Solving the Problems

An acoustic device according to an aspect of the invention includes: a rotary operator; and a base supporting the rotary operator so that the rotary operator is rotatable, the base including: a braking unit configured to be brought into contact with the rotary operator to cause a braking force to act on the rotary operator; and an adjuster configured to adjust the braking force caused by the braking unit, the braking unit including a plurality of contact members configured to be brought into contact with the rotary operator to cause the braking force to act on the rotary operator, in which the braking force acting on the rotary operator by the plurality of contact members varies depending on an adjustment amount by the adjuster.

In the acoustic device according to the above aspect, the braking force applied to the rotary operator can be adjusted depending on the adjustment amount by the adjuster.

BRIEF DESCRIPTION OF DRAWING(S)

FIG. 4 is another exploded perspective view of the jog dial according to the exemplary embodiment.

FIG. 12 is a cross-sectional view of the braking unit according to the exemplary embodiment.

DESCRIPTION OF EMBODIMENT(S)

An exemplary embodiment of the invention is explained below on the basis of the attached drawings.

Schematic Configuration of Playback System

Figure 1:
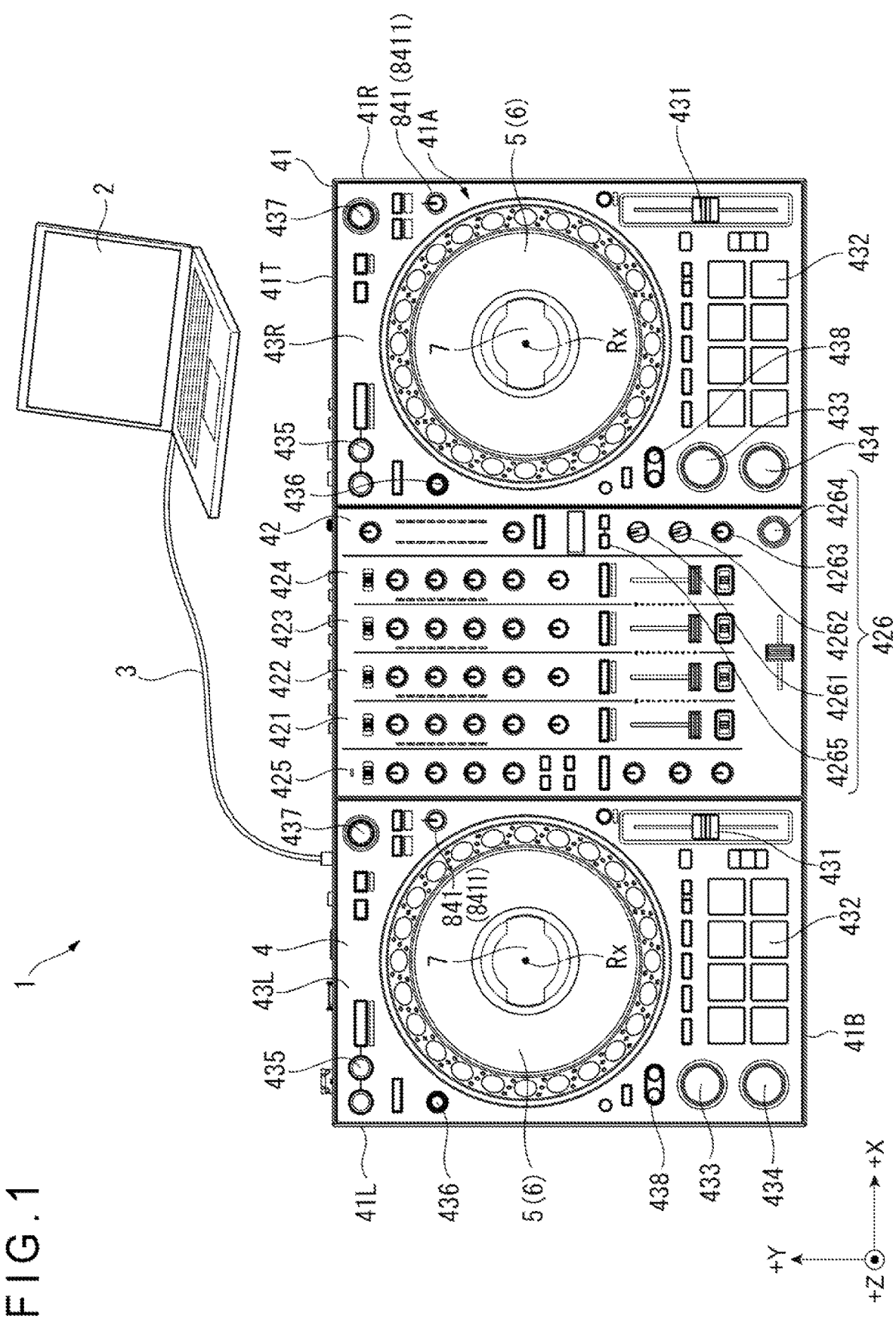
FIG. 1 shows a playback system according to an exemplary embodiment.

FIG. 1 shows a playback system 1 according to the exemplary embodiment of the invention.

As shown in FIG. 1, the playback system 1 according to the exemplary embodiment includes an information processing device 2, a DJ controller 4 connected to the information processing device 2, and a cable 3 connecting the information processing device 2 and the DJ controller 4.

Configuration of Information Processing Device

The information processing device 2 plays audio data such as music data and outputs the audio data to the DJ controller 4 via the predetermined cable 3. A playback control signal is input from the DJ controller 4 to the information processing device 2 via the cable 3. The information processing device 2 adds a variety of sound effects to music data being played based on the playback control signal input thereto.

Such an information processing device 2 may be provided, for instance, by a personal computer (PC). Specifically, the information processing device 2 is configured, for instance, to include an arithmetic processor such as a Central Processing Unit (CPU) and a storage such as a Hard Disk Drive (HDD).

Schematic Structure of DJ Controller

The DJ controller 4 corresponds to an acoustic device. The DJ controller 4 includes a casing 41, a mixer 42, a left deck 43L, and a right deck 43R. The mixer 42 and the decks 43L, 43R are provided for the casing 41.

It should be noted that a concept of the acoustic device in the exemplary embodiment includes not only a sound playback controller but also a sound playback device for playing music data.

Structure of Casing

The casing 41 includes a top surface 41A, an upper surface 41T, a lower surface 41B, a left surface 41L, a right surface 41R, and a bottom surface (not shown). The entire casing 41 is formed into a substantially rectangular parallelepiped shape.

The top surface 41A is directed upward to face an operator when the DJ controller 4 is placed on an installation surface.

The bottom surface is provided opposite to the top surface 41A in the casing 41. Though not shown, the bottom surface includes a plurality of legs in contact with the installation surface.

The upper surface 41T is provided opposite to the lower surface 41B in a lateral direction of the casing 41. Specifically, when the casing 41 is seen from a position facing the top surface 41A, the upper surface 41T is positioned farther from an operator than the lower surface 41B and the lower surface 41B is positioned closer to the operator than the upper surface 41T.

The left surface 41L is provided opposite to the right surface 41R in a longitudinal direction of the casing 41. Specifically, when the casing 41 with the upper surface 41T facing upward is seen from a position facing the top surface 41A, the left surface 41L is positioned left and the right surface 41R is positioned right in the casing 41.

The mixer 42 is disposed in a center portion of the top surface 41A. The mixer 42 executes switching of audio data input from the information processing device 2, sound control for each channel, and addition of sound effects. The mixer 42 includes four channel adjusters 421 to 424, a microphone adjuster 425, and an effector 426.

The effector 426 is provided in a lower right portion of the mixer 42 to add a musical sound effect to a music piece being played. The effector 426 includes an effect selection switch 4261, a channel selection switch 4262, an effect-amount adjusting switch 4263, an effect adding switch 4264, and a beat changing button 4265.

The left deck 43L is disposed on the top surface 41A on the left of the mixer 42. The right deck 43R is disposed on the top surface 41A on the right of the mixer 42. The left deck 43L and the right deck 43R apply a variety of effects to audio data input from the information processing device 2 in accordance with an operator's operation.

The left deck 43L and the right deck 43R each include a jog controller 5, a tempo slider 431, a performance pad 432, a cue button 433, a play/pause button 434, a loop button 435, a deck selection button 436, a load button 437, and a cue/loop call switch 438.

The jog controller 5 includes a jog dial 6, which is rotatable with a rotation axis Rx extending along +Z direction as the center. Fast-forwarding or reversing of the audio data to be played is executed through an operator's rotating operation on the jog dial 6.

A center portion of the jog controller 5 as viewed from the +Z direction is provided with a display 7. The display 7 displays, for instance, a value of Beats Per Minute (BPM), a playback-elapsed time, a progression state, and a beat position of the audio data being played as well as a rotation state of an LP record at 33 RPM according to the progression of the audio data being played.

A structure of the jog controller 5 is described below in detail.

The tempo slider 431 adjusts a tempo of the audio data to be played.

The performance pad 432 executes switching of effects to the audio data being played. The performance pad 432 includes a plurality of buttons. The effect, such as loop, cue, key shift, or sampler, is instantaneously added to the music data being played in response to an operator's pressing operation on one of the buttons.

The cue button 433 is a button for cueing a music piece to be played.

The play/pause button 434 is a button for starting the play of the music data or pausing the audio data being played.

The loop button 435 is a button for looping the audio data being played.

The deck selection button 436 is a button with which a channel of audio data to be played is selected among the channel adjusters 421 to 424 of the mixer 42. In the exemplary embodiment, switching of the channel adjusters 421, 422 can be executed in the left deck 43L, and switching of the channel adjusters 423, 424 can be executed in the right deck 43R.

The load button 437 is a button for loading audio data from the information processing device 2. When the load button 437 is pressed after audio data to be played on the information processing device 2 is selected, the audio data is loaded to any of the channels of the channel adjuster 421 to 424.

The cue/loop call switch 438 is a switch for calling a cue point stored.

In the following, three directions orthogonal to each other are defined as +X direction, +Y direction, and +Z direction. The +Z direction is defined as a direction directed from the bottom surface to the top surface 41A. The +X direction is defined as a direction directed from the left surface 41L to the right surface 41R. The +Y direction is defined as a direction from the lower surface 41B to the upper surface 41T. Though not shown, a direction opposite to the +X direction is defined as −X direction, a direction opposite to the +Y direction is defined as −Y direction, and a direction opposite to the +Z direction is defined as −Z direction, for convenience of the explanation.

Structure of Jog Controller

Figure 2:
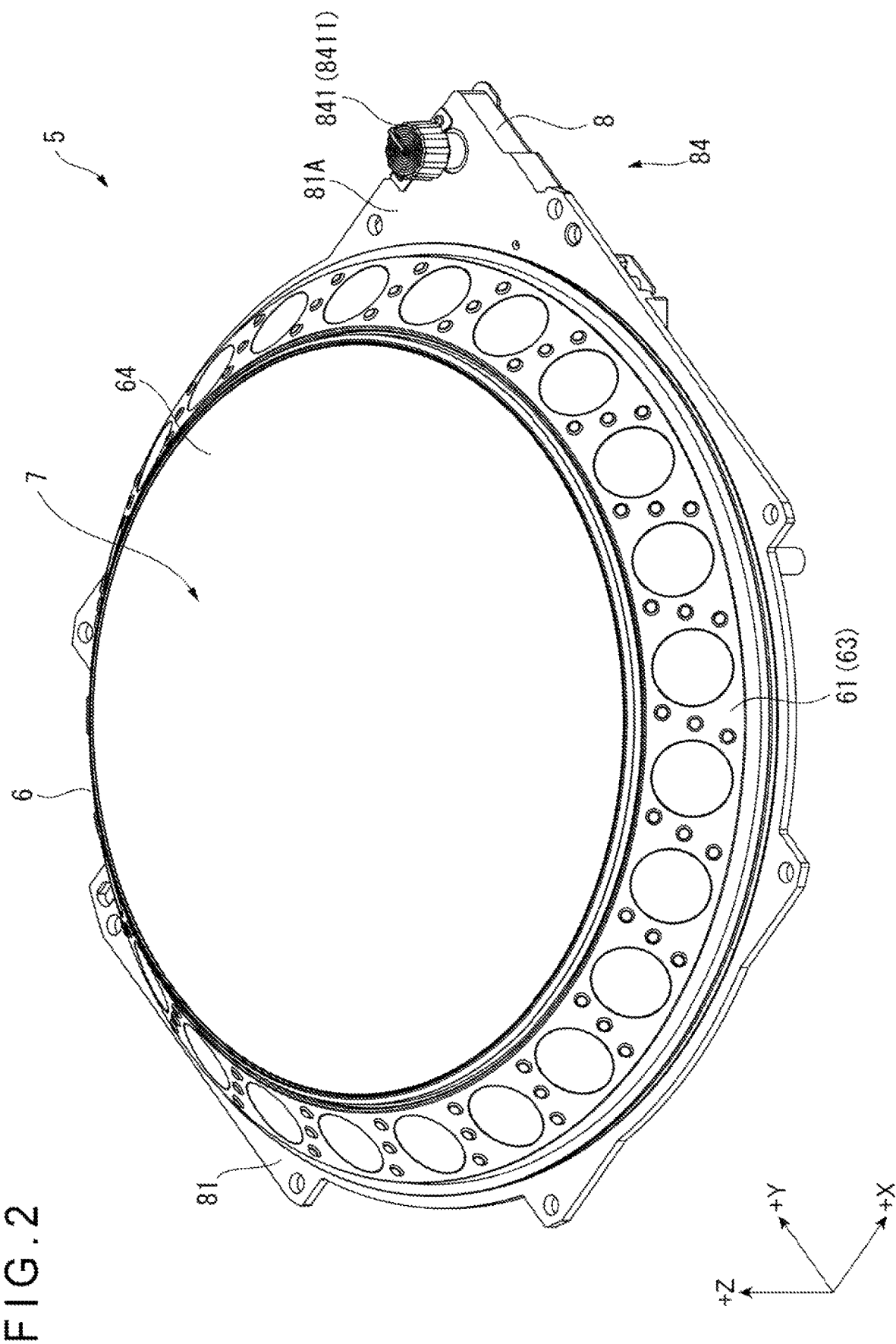
FIG. 2 is a perspective view of a jog controller according to the exemplary embodiment.

FIG. 2 is a plan view of the jog controller 5 as viewed from the +Z direction.

The jog controller 5 is a rotating operation device configured to output an operation signal for executing fast-forwarding or reversing of the audio data to be played, as described above. The jog controller 5 is provided for each of the left deck 43L and the right deck 43R. As shown in FIG. 2, such a jog controller 5 includes the jog dial 6, the display 7, and a base 8.

Structure of Jog Dial

Figure 3:
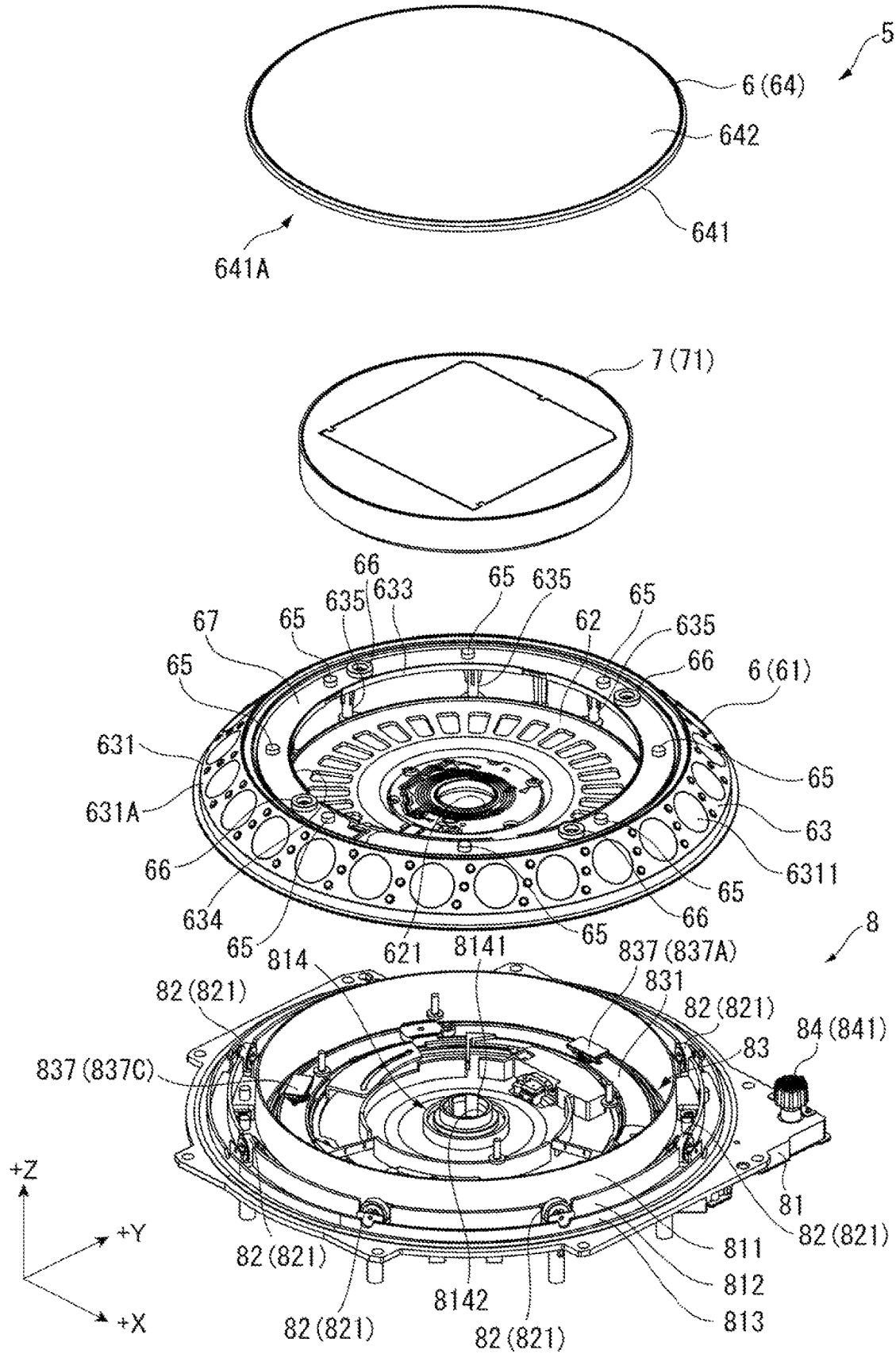
FIG. 3 is an exploded perspective view of a jog dial according to the exemplary embodiment.

FIGS. 3 and 4 are each an exploded perspective view of the jog dial 6. Specifically, FIG. 3 is an exploded perspective view of the jog dial 6 as viewed from the +Z direction, and FIG. 4 is an exploded perspective view of the jog dial 6 as viewed from the −Z direction.

The jog dial 6 is a rotary operator disposed on the base 8. As shown in FIG. 1, the jog dial 6, which is formed into a circular shape as viewed from the +Z direction, is provided to be exposed on the top surface 41A of the casing 41. An operator performs a rotating operation on the jog dial 6. As shown in FIGS. 3 and 4, the jog dial 6 includes a rotating body 61, a top plate 64, elastic members 65, 66, and a press detecting unit 67. The top plate 64, the elastic members 65, 66, and the press detecting unit 67 are provided for the rotating body 61.

Structure of Rotating Body

The rotating body 61 is a main body of the jog dial 6. The rotating body 61 is rotatably disposed on the base 8 with the rotation axis Rx as the center. The rotating body 61 includes a support portion 62 and a body 63.

The support portion 62, which is formed into a disk shape as viewed from the −Z direction, is disposed inside a guide rib 811 of the base 8 described later on. A bottom surface 62A, which is a surface in the −Z direction of the support portion 62, is brought into contact with a plurality of braking pads 837 described below. The braking pads 837 are brought into contact with the bottom surface 62A from the −Z direction to the +Z direction, thereby causing a braking force to act on the jog dial 6 during the rotation of the jog dial 6.

A center portion of the support portion 62 as viewed from the +Z direction is provided with a circular opening 621. A cylindrical portion 8141 of the base 8 is inserted into the opening 621. The jog dial 6 is thus rotationally movable as the rotation axis Rx as the center. As shown in FIG. 4, a disk portion RD1 forming a rotation detecting unit RD for detecting rotation of the jog dial 6, a wireless communication unit (not shown) for transmitting a pressing operation performed on the jog dial 6 to the base 8, and the like are provided around the opening 621.

As shown in FIGS. 3 and 4, the body 63 is formed into a flat truncated-cone shape as viewed from the +X direction or the +Y direction orthogonal to the +Z direction. The body 63 surrounds the support portion 62 as viewed from the +Z direction. The body 63 includes a lateral portion 631, a rib 632, a step portion 633, an opening 634, and connecting portions 635.

The lateral portion 631, which is formed into an annular shape as viewed from the +Z direction, is an inclined portion of which outer diameter is smaller toward the +Z direction. An outer surface 631A of the lateral portion 631 is provided with a plurality of recesses 6311 into which an operator can insert his/her finger(s). The recesses 6311 assist the rotating operation of the jog dial 6. The recesses 6311 are arranged in a circumferential direction of the outer surface 631A at regular intervals.

As shown in FIG. 4, the rib 632, which protrudes from an inner surface 631B of the lateral portion 631 in the −Z direction, is formed into a substantially annular shape as viewed from the −Z direction. The rib 632 is in contact with a plurality of rollers 821 (FIG. 3) forming rotation support portions 82 (described later) of the base 8. The jog dial 6 is thus supported to be rotatable as the rotation axis Rx as the center.

As shown in FIG. 3, the step portion 633 is positioned at a level one step lower in the −Z direction than an end in the +Z direction of the lateral portion 631. Specifically, the step portion 633, which is positioned in the −Z direction with respect to an end in the +Z direction of the body 63, is an annular portion along an XY plane. The top plate 64 is fitted in the step portion 633.

The opening 634 is defined by an inner edge of the step portion 633 into a circular shape as viewed from the +Y direction. The display 7 is disposed in the opening 634.

As shown in FIGS. 3 and 4, the connecting portions 635, which protrude in the −Z direction from a surface 633B in the −Z direction of the step portion 633, connect the body 63 and an outer edge of the support portion 62. The number of the connecting portions 635 is nine in the exemplary embodiment, but not limited thereto.

Structure of Top Plate

The top plate 64 is a pressed portion through which an operator performs a pressing operation on the jog dial 6. The top plate 64 includes a frame 641 and a circular-shaped light-transmitting component 642.

The frame 641 is an annular frame surrounding the light-transmitting component 642 as viewed from the +Z direction. The light-transmitting component 642 adheres to a surface in the +Z direction of the frame 641. The top plate 64 is attached to the rotating body 61 by fixing the frame 641 to the step portion 633. As shown in FIG. 4, a surface 641A in the −Z direction of the frame 641 is provided with recesses 6411 and a plurality of bosses 6412. Each recess 6411 is recessed in the +Z direction to accommodate a part of the corresponding one of the elastic members 65. The plurality of bosses 6412 protrude in the −Z direction from the surface 641A.

As shown in FIG. 3, the light-transmitting component 642 is a circular-disk member covering the display 7 in the +Z direction. The light-transmitting component 642, which is formed from a material through which an image displayed by the display 7 istransmissive, protects the display 7. An operator can see the image on the display 7 through the light-transmitting component 642.

Structure of Elastic Member and Press Detecting Unit

As shown in FIG. 3, the elastic members 65, 66 and the press detecting unit 67 are provided between the top plate 64 and the rotating body 61. Specifically, the elastic members 65, 66 and the press detecting unit 67 are provided between the frame 641 and the step portion 633.

The elastic members 65 are provided between the press detecting unit 67 and the frame 641. The elastic members 65 are arranged at regular intervals along a circumferential direction centered on the center of the jog dial 6 as viewed from the +Z direction. In the exemplary embodiment, the elastic members 65 are in a form of rubber cylinders. A total of eight elastic members 65 are arranged at every 60 degrees with the center of the jog dial 6 as the center. The frame 641 is positioned spaced apart from the press detecting unit 67 by providing the elastic members 65, 66.

The elastic members 66 are arranged at substantially regular intervals along the circumferential direction centered on the center of the jog dial 6 as viewed from the +Z direction. Specifically, four elastic members 66 are provided at substantially regular intervals along the circumferential direction. The elastic members 66 are each formed into an annular shape into which the boss 6412 protruding in the −Z direction from the surface 641A of the frame 641 is insertable, as viewed from the +Z direction. The elastic members 66 are formed from an elastic material such as rubber and sponge.

The surfaces in the +Z and −Z directions of the elastic member 66 are adhesive surfaces. The elastic members 66 adhere to the frame 641 positioned in the +Z direction with respect to the elastic members 66 and the press detecting unit 67 positioned in the −Z direction with respect to the elastic members 66. That is, the elastic members 66 fix the frame 641 to an outside portion of a detection area of the press detecting unit 67 with a space between the frame 641 and the press detecting unit 67. The frame 641 disposed as described above allows a pressing force against the press detecting unit 67 to be adjusted.

The press detecting unit 67 having an annular shape is provided over substantially the whole area of a surface in the +Z direction of the step portion 633. The press detecting unit 67 may be provided, for instance, by a resistive film type sheet switch or any other pressure detecting unit such as a pressure sensitive sensor or a tact switch.

The press detecting unit 67 detects a pressure transmitted via the elastic members 65, 66 when the top plate 64 serving as the pressed portion is pressed by an operator, and outputs a signal indicating that the top plate 64 is pressed by the user. In short, the press detecting unit 67 outputs the signal indicating that the top plate 64 is pressed by the user.

Structure of Display

Figure 5:
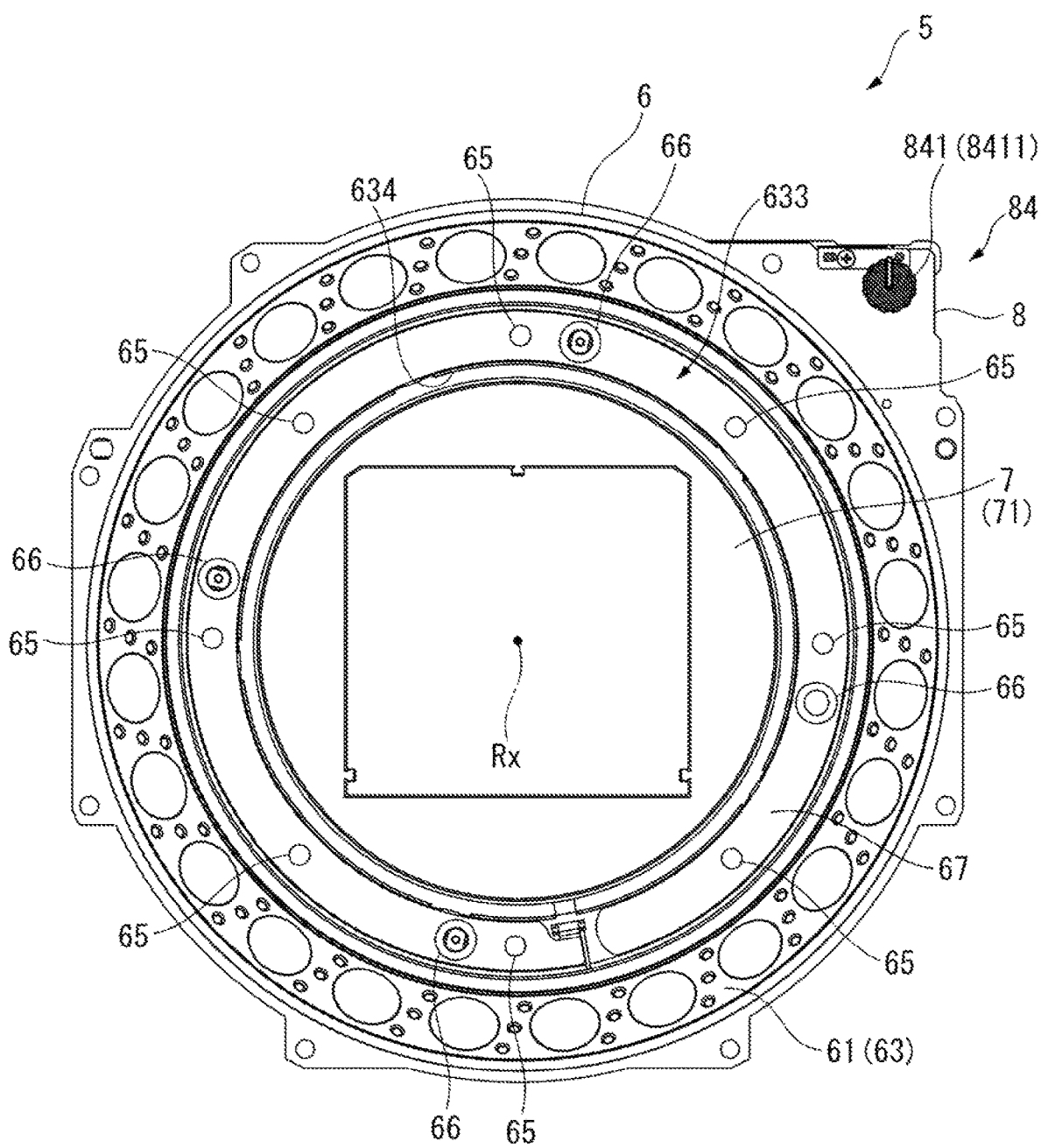
FIG. 5 is a plan view of the jog controller from which a top plate is removed according to the exemplary embodiment.

FIG. 5 is a plan view, as viewed from the +Z direction, of the jog controller 5 from which the top plate 64 of the jog dial 6 is removed.

As shown in FIGS. 3 and 5, the display 7 is disposed in the jog dial 6, specifically, inside the opening 634 of the jog dial 6 as viewed from the +Z direction. More specifically, the display 7 is disposed between the support portion 62 and the top plate 64 so that the circumference of the display 7 is surrounded by the body 63. The display 7 is disposed in the center of a space inside the guide rib 811 (see FIGS. 6 to 8) described later as viewed from the +Z direction.

As shown in FIGS. 3 to 5, the display 7 includes a display body 71 provided with a display panel. Further, as shown in FIG. 4, the display 7 includes a fitting portion 72 protruding from the display body 71 in the −Z direction.

The display body 71 displays an image in accordance with image information input via Flexible Printed Circuits (FPC, FIG. 4). The FPC is placed through the fitting portion 72 to extend in the −Z direction.

The fitting portion 72 is fitted into a through hole 8142 (see FIGS. 6 to 8) of the base 8 described later. An outer surface of the fitting portion 72 is provided with a protrusion, which is fitted into a recess 8143 of the through hole 8142. The display 7 is thus fixed to the base 8 so as not to be rotatable.

Structure of Base

Figure 6:
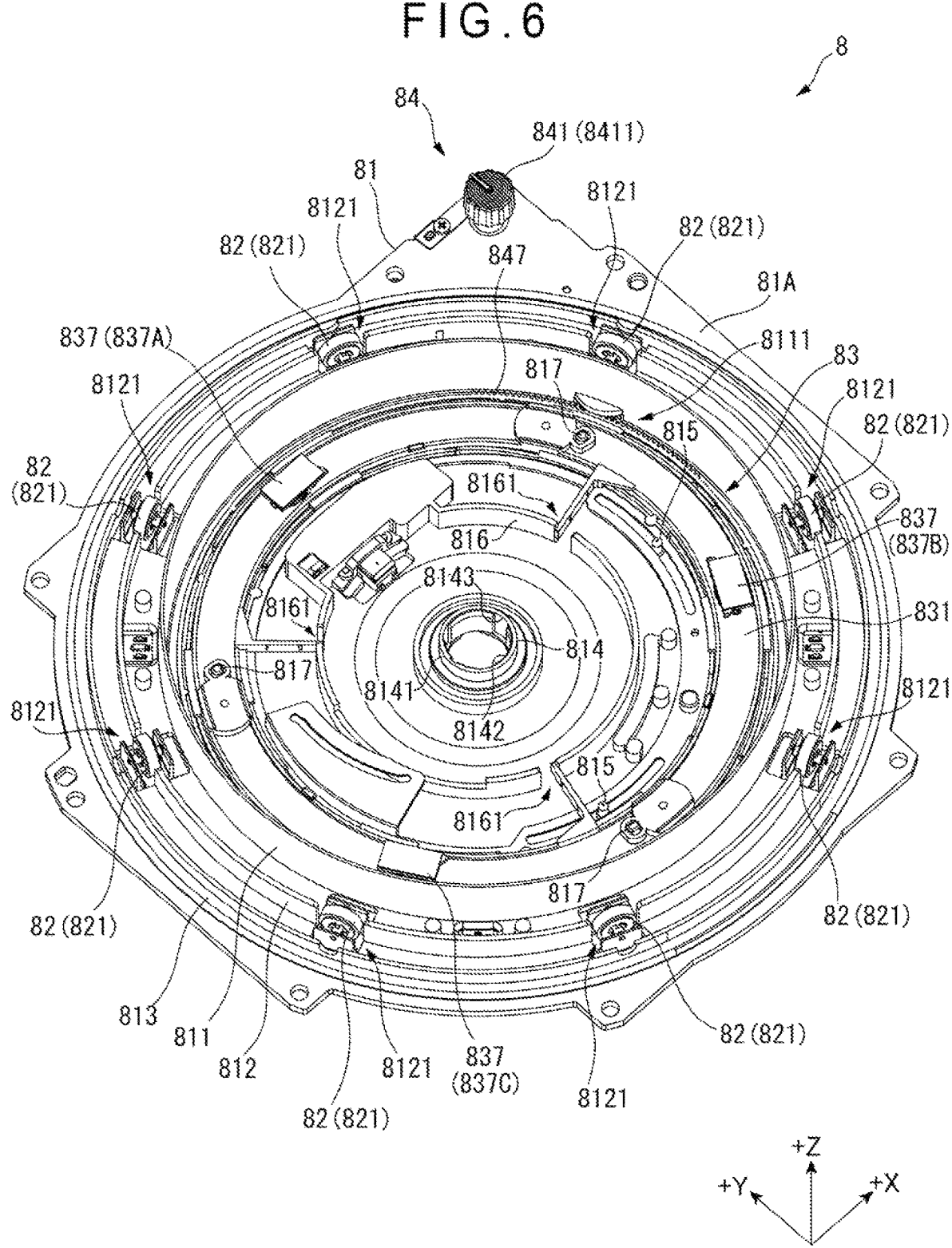
FIG. 6 is a perspective view of a base according to the exemplary embodiment.

FIG. 6 is a perspective view of the base 8 as viewed from the +Z direction. The base 8, which is fixed to the casing 41, supports the jog dial 6 and the display 7 as described above.

As shown in FIG. 6, the base 8 includes a body 81, the rotation support portions 82, a braking unit 83, and an adjuster 84. The rotation support portions 82, the braking unit 83, and the adjuster 84 are provided for the body 81.

Structure of Body

Figure 7:
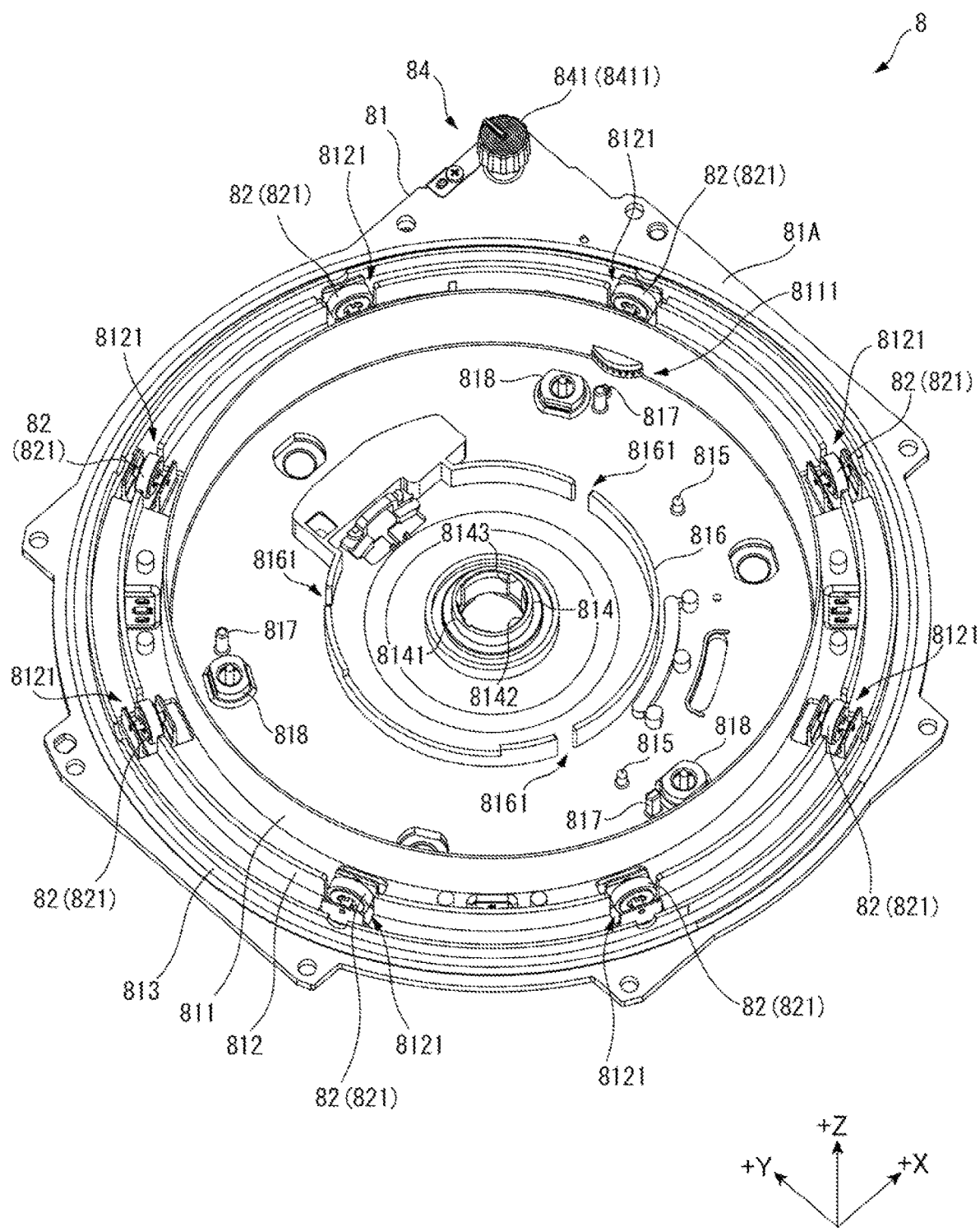
FIG. 7 is a perspective view of a body of the base according to the exemplary embodiment.
Figure 8:
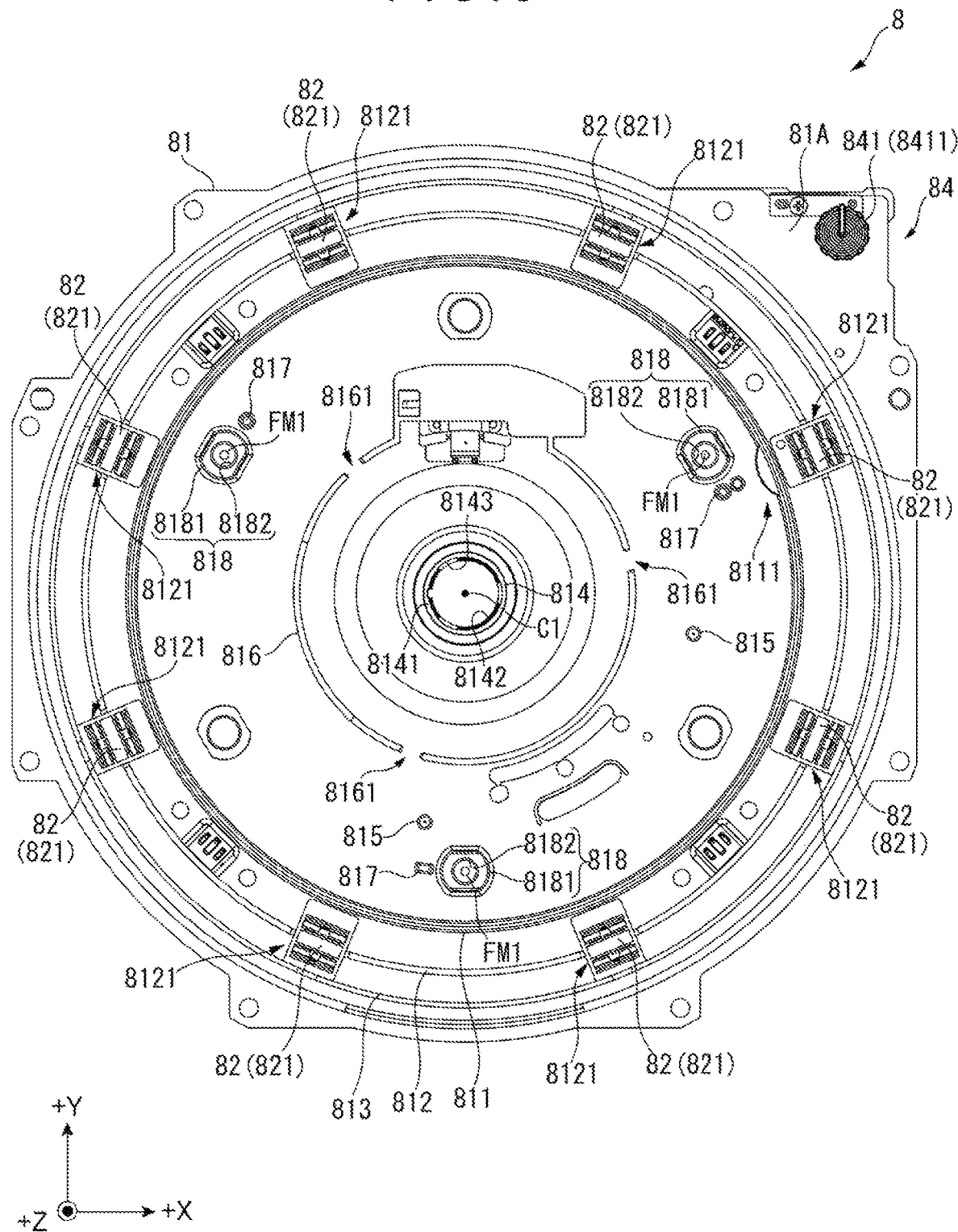
FIG. 8 is a plan view of the body of the base according to the exemplary embodiment.

FIGS. 7 and 8 are respectively a perspective view and a plan view of the body 81 as viewed from the +Z direction. Specifically, FIGS. 7 and 8 are respectively a perspective view and a plan view as viewed from the +Z direction showing the base 8 in which illustration of the braking unit 83 and a rotationally moving base 847 of the adjuster 84 is omitted.

As shown in FIGS. 6 to 8, the body 81, which is formed into a substantially rectangular flat plate shape as viewed from the +Z direction, is attached to the casing 41. The body 81 supports the jog dial 6 so that the jog dial 6 is rotatable. The display 7 is fixed to the body 81.

As shown in FIGS. 6 to 8, the body 81 includes guide ribs 811 to 813, a fixing portion 814, guide pins 815, a regulatory rib 816, regulatory pins 817, and arrangement portions 818.

The guide ribs 811 to 813 are arranged concentrically to protrude in the +Z direction from a surface 81A in the +Z direction of the body 81. That is, the guide ribs 811, 812, and 813 are sequentially arranged in this order from a position close to a center C1 (FIG. 8) of the guide rib 811 as viewed in the +Z direction, the guide rib 811 being positioned closest to the center C1, the guide rib 812 being positioned the second closest to the center C1, and the guide rib 813 being farthest from the center C1.

The guide rib 811 extends beyond the guide ribs 812, 813 in the +Z direction. The support portion 62 of the jog dial 6 is disposed inside the guide rib 811. The guide rib 811 includes an opening 8111 through which a gear 846 of the adjuster 84 described later is exposed.

The guide rib 812 is provided between the guide rib 811 and the guide rib 813 positioned outmost. Cuts 8121 are formed in the guide rib 812 at every predetermined angle with the center C1 as the center. The cuts 8121 are each provided with a roller 821 forming the rotation support portion 82. In the exemplary embodiment, a total of eight cuts 8121 are provided at every 45 degrees with respect to the center C1. The guide rib 812 and the guide rib 813 guide the rotation of the jog dial 6, and inhibits the jog dial 6 from being shifted from the base 8 in the −Z direction.

The fixing portion 814, guide pins 815, regulatory rib 816, regulatory pins 817 and arrangement portions 818 are provided inside the guide rib 811 as viewed from the +Z direction.

The fixing portion 814 is a portion to which the display 7 is fixed. Further, the fixing portion 814 supports the jog dial 6 so that the jog dial 6 is rotatable. The fixing portion 814 is positioned in the center of the space surrounded by the guide rib 811. The fixing portion 814 includes the cylindrical portion 8141 protruding in the +Z direction, the through hole 8142, and the recess 8143.

The cylindrical portion 8141 is inserted into the opening 621 to form the rotation axis Rx of the jog dial 6.

The through hole 8142 passes through the cylindrical portion 8141 in the +Z direction.

The recess 8143 is recessed outward radially from an inner edge of the through hole 8142. When the fitting portion 72 of the display 7 is inserted into the through hole 8142 with the cylindrical portion 8141 placed into the jog dial 6, a part of the fitting portion 72 is fitted into the recess 8143. The display 7 is thus attached to the fixing portion 814 with the rotational movement centered on a rotational movement axis extending along the +Z direction being restricted.

The guide pins 815 protrude from the surface 81A in the +Z direction. The guide pins 815 are inserted into the rotationally moving base 847 described later to guide rotational movement of the rotationally moving base 847.

The regulatory rib 816 is formed in a circle centered on the center C1 as viewed from the +Z direction. The regulatory rib 816 includes three cuts 8161. Regulatory portions 833 of a support base 831 described later are inserted into the respective cuts 8161.

The regulatory pins 817 and the arrangement portions 818 are provided at every predetermined angle with the center C1 as the center. In the exemplary embodiment, three regulatory pins 817 and three arrangement portions 818 are provided at every 120 degrees.

The regulatory pins 817 protrude from the surface 81A in the +Z direction. The regulatory pins 817, which are inserted into the support base 831, regulate the rotational movement of the support base 831 centered on the rotational movement axis extending along the +Z direction.

A biasing member BM1 (compression coil spring, see FIG. 9) and a fixing member FM1 (screw, FIG. 9) are arranged in each arrangement portion 818. The fixing member FM1 is placed through the biasing member BM1 and an end of the fixing member FM1 is fixed to the support base 831. The arrangement portions 818 each include a boss 8181 protruding from the surface 81A in the +Z direction. The boss 8181 has a through hole 8182 passing through the body 81 in the +Z direction.

Structure of Rotation Support Portion

The rotation support portions 82 support the jog dial 6 so that the jog dial 6 is rotatable. The rotation support portions 82 are rotatably provided in the cuts 8121. A plurality of rollers 821 in contact with the rib 632 are provided in the rotation support portions 82.

A rotational shaft of each roller 821 extends toward the center of the guide rib 811. When the rotating operation is performed on the jog dial 6 and the rib 632 slides on the rollers 821, the rollers 821 rotate to smoothly rotate the jog dial 6.

Structure of Braking Unit

Figure 9:
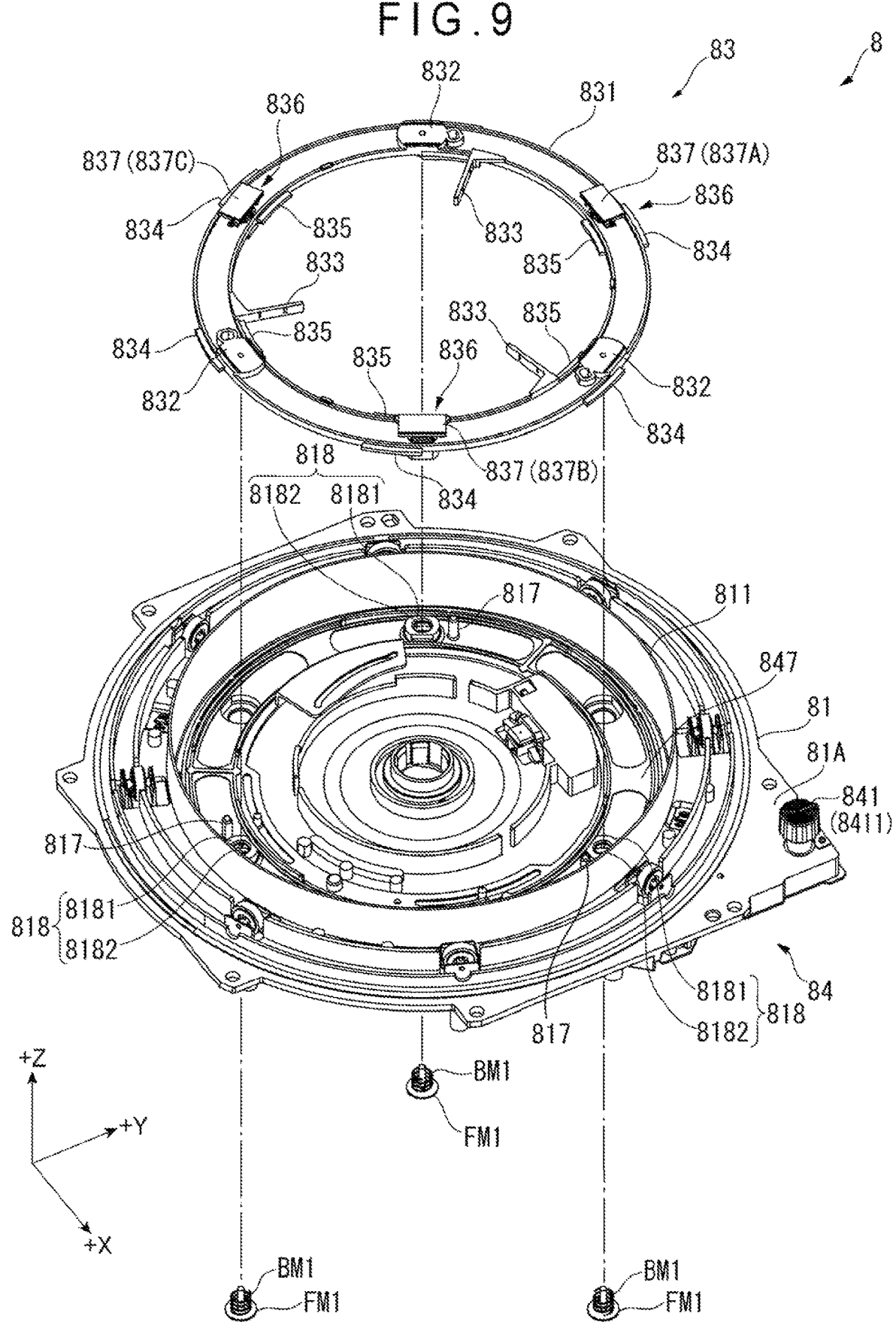
FIG. 9 is a perspective view of a braking unit separated from the body according to the exemplary embodiment.

FIG. 9 is a perspective view of the braking unit 83 and the body 81 separated from each other.

A braking force acts on the jog dial 6 by applying a rotation load to the jog dial 6 by the braking unit 83. Specifically, the braking force acts on the support portion 62 by bringing the braking unit 83 into contact with the support portion 62 of the jog dial 6. The braking unit 83 is provided in the space inside the guide rib 811 at a position close to an outer circumference of the guide rib 811.

As shown in FIG. 9, the braking unit 83 includes an annular support base 831 and a plurality of braking pads 837 (837A to 837C).

Structure of Support Base

Figure 10:
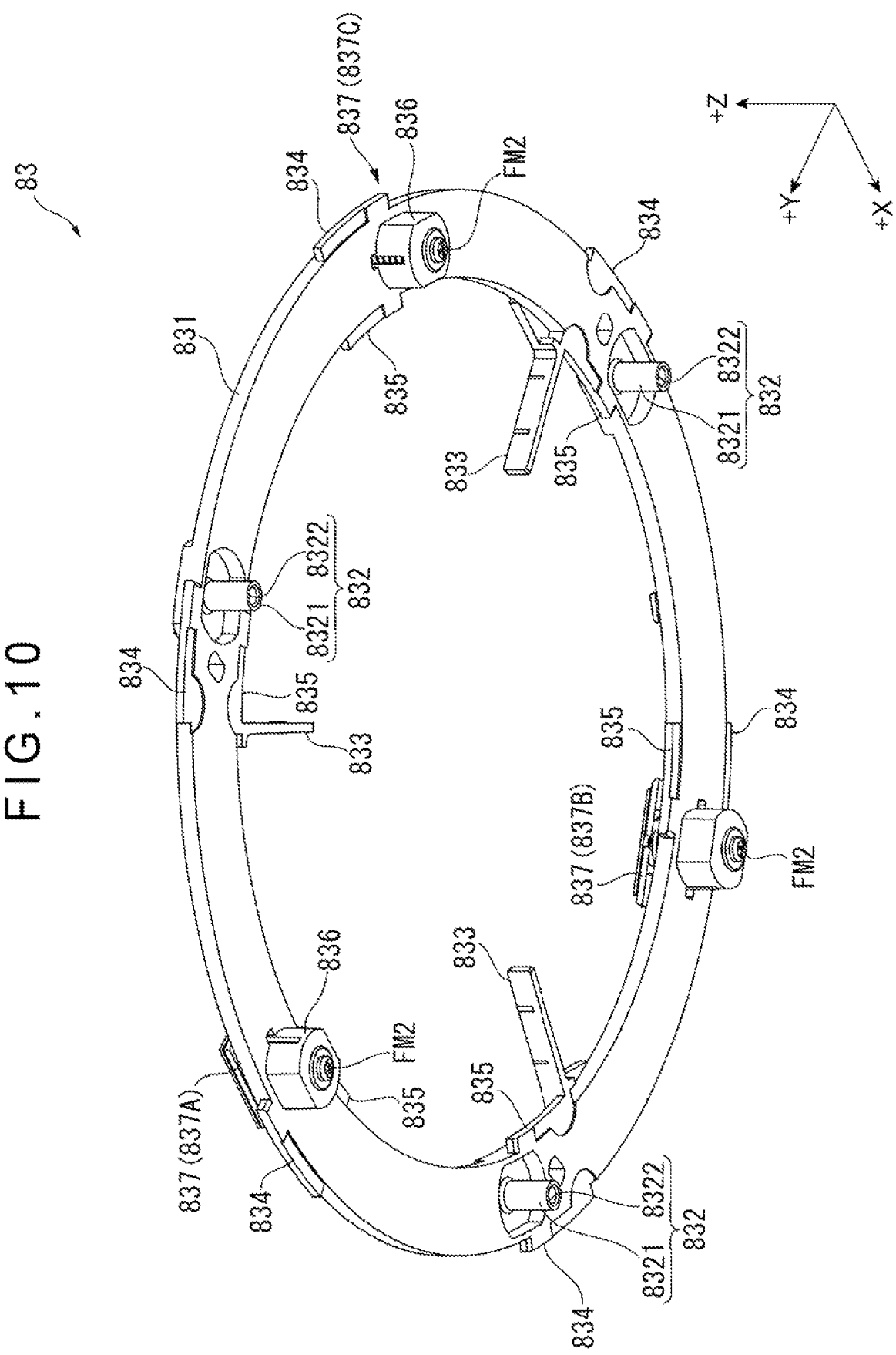
FIG. 10 is a perspective view of the braking unit according to the exemplary embodiment.
Figure 11:
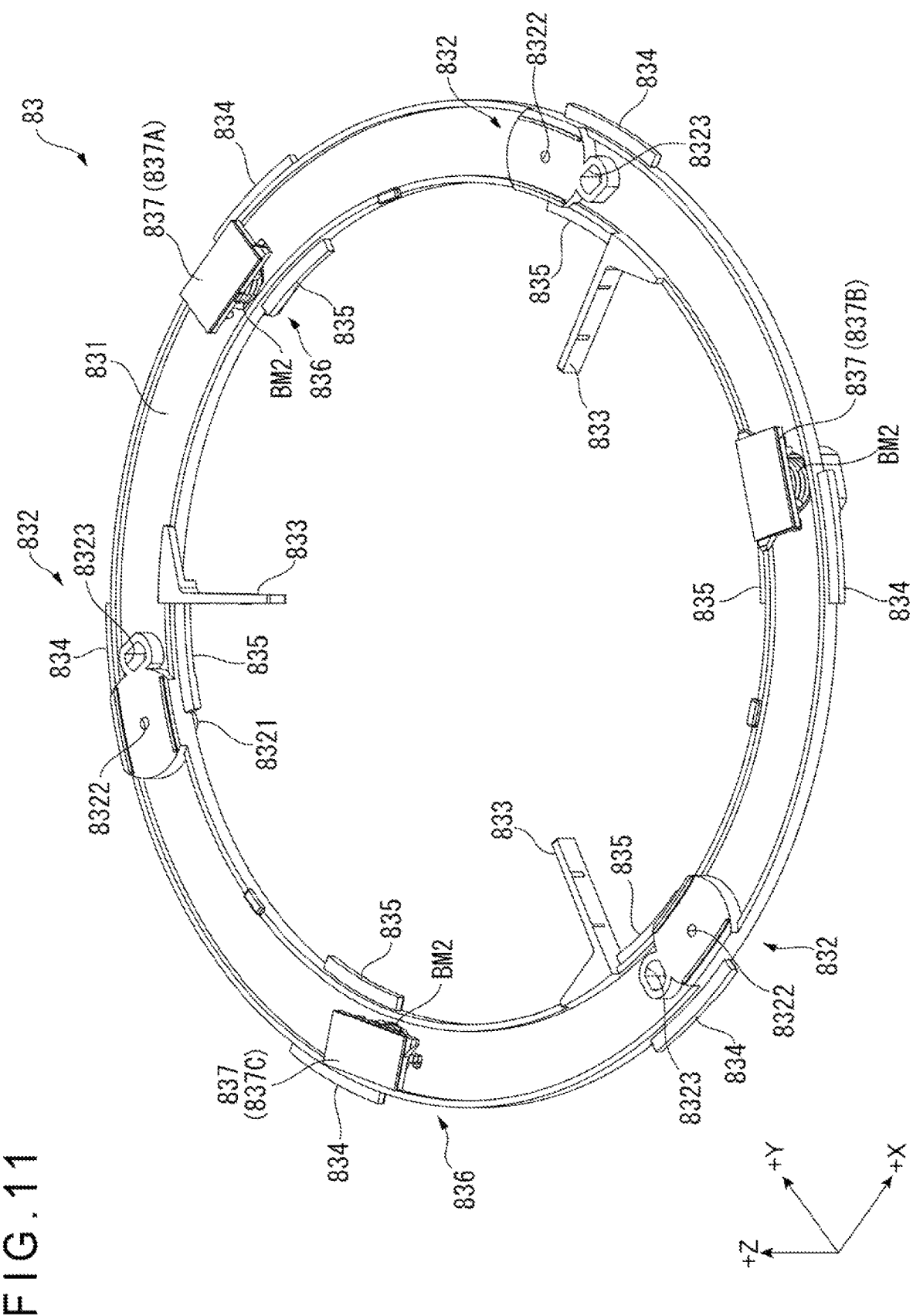
FIG. 11 is another perspective view of the braking unit according to the exemplary embodiment.

FIGS. 10 and 11 are perspective views of the braking unit 83 as viewed from the −Z direction and the +Z direction.

As shown in FIG. 9, the support base 831 is disposed to overlap in the +Z direction with the rotationally moving base 847 disposed inside the guide rib 811. The support base 831 is an annular support member supporting the plurality of braking pads 837 such that the braking pads 837 are deeply insertable in the −Z direction into the support base 831. The support base 831 is attached to the body 81 to be displaceable in the ±Z directions by the fixing members FM1 and the biasing members BM1.

As shown in FIGS. 10 and 11, the support base 831 includes a plurality of attachment portions 832, the plurality of regulatory portions 833, a plurality of outward protrusions 834, and a plurality of inward protrusions 835.

As shown in FIG. 11, three attachment portions 832 are provided at regular intervals along a circumferential direction of the support base 831. Each attachment portion 832 includes a boss 8321 protruding in the −Z direction from a surface in the −Z direction of the support base 831, a screw hole 8322 provided in the boss 8321 to penetrate the support base 831 in the +Z direction, and a through hole 8323 penetrating the support base 831 in the +Z direction.

FIG. 12 is a cross-sectional view of the braking unit 83 attached to the body 81. Specifically, FIG. 12 shows a cross section, taken along an XZ plane, of one of the three attachment portions 832 and the arrangement portion 818 corresponding thereto.

As shown in FIG. 12, the boss 8321 is inserted into the through hole 8182 in the −Z direction. In the through hole 8182, an end in the −Z direction of the boss 8321 is exposed in the −Z direction. In the through hole 8182, the biasing member BM1 is provided around the boss 8321. An end in the +Z direction of the biasing member BM1 is in contact with an inner surface in the +Z direction of the boss 8181.

As shown in FIGS. 9 and 12, the fixing member FM1, which is a screw, is fixed to the screw hole 8322 that is open in the −Z direction. As shown in FIG. 12, a head FM11 of the fixing member FM1 is larger in outer diameter than the boss 8321 and the biasing member BM1. An end in the −Z direction of the biasing member BM1 is thus in contact with a surface in the +Z direction of the head FM11.

The regulatory pin 817 is inserted into the through hole 8323.

Herein, since the biasing member BM1 of which end in the +X direction is in contact with the inner surface of the boss 8181 applies a biasing force in the −Z direction to the fixing member FM1, the support base 831 is biased in the −Z direction, that is, toward the surface 81A. This structure inhibits play between the support base 831 and the rotationally moving base 847 on which the support base 831 is placed and play between the rotationally moving base 847 and the surface 81A.

The regulatory portions 833 extend toward the center of the annular support base 831. The regulatory portions 833 are inserted into the cuts 8161 corresponding thereto.

The outward protrusions 834 are provided for an outer edge of the support base 831 at regular intervals to protrude outward radially from the outer edge of the support base 831. The inward protrusions 835 are provided for an inner edge of the support base 831 at regular intervals to protrude inward radially from the inner edge of the support base 831. The inward protrusions 835 are positioned in a direction toward the center of the support base 831 from the outer protrusions 834.

The support base 831 moves in the ±Z directions by shifting the outward protrusions 834 and the inward protrusions 835 along the rotationally moving base 847 in the ±Z directions during the rotational movement of the rotationally moving base 847, as described below in detail.

Figure 13:
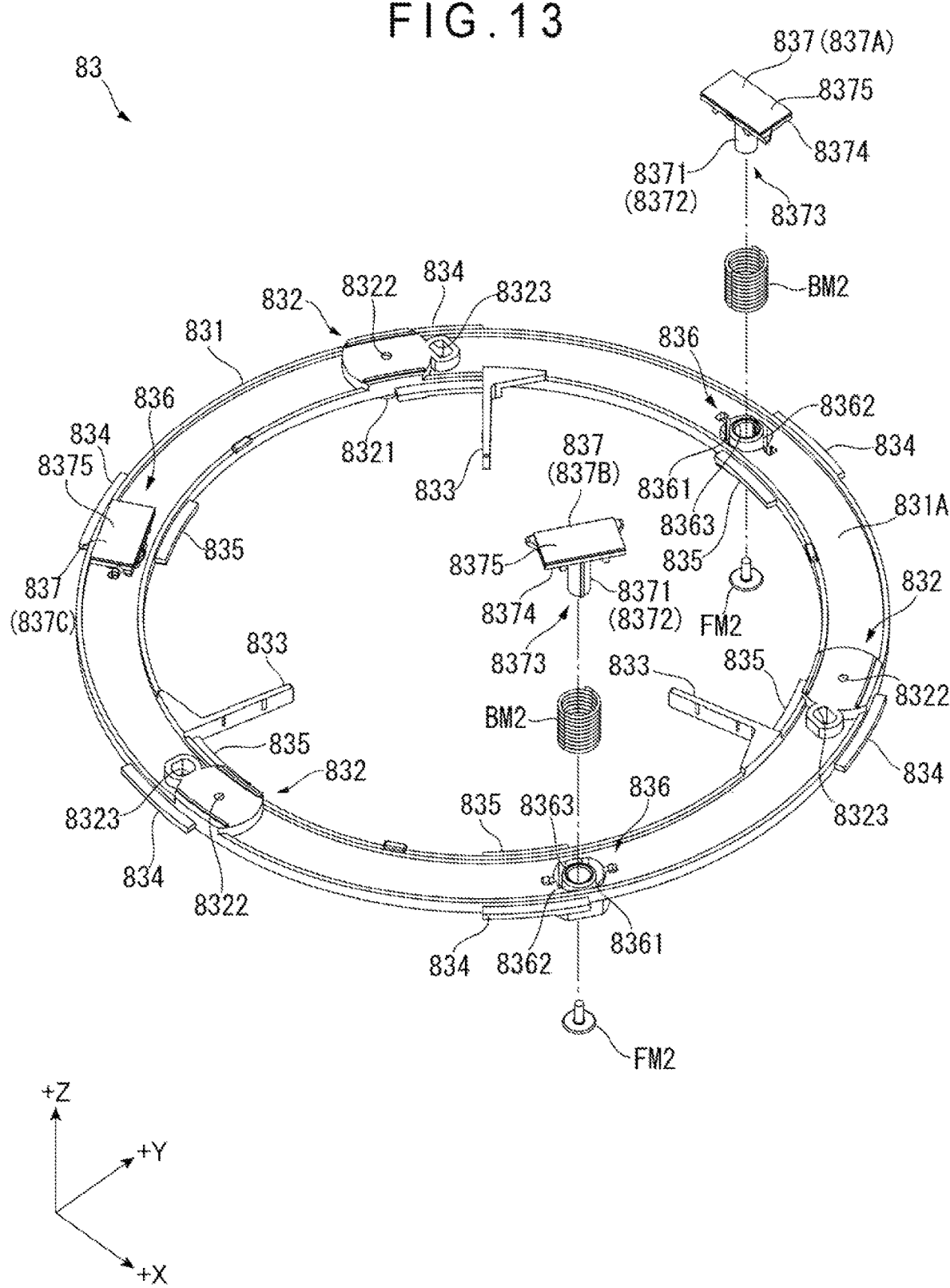
FIG. 13 is a perspective view of braking pads separated from a support base according to the exemplary embodiment.
Figure 14:
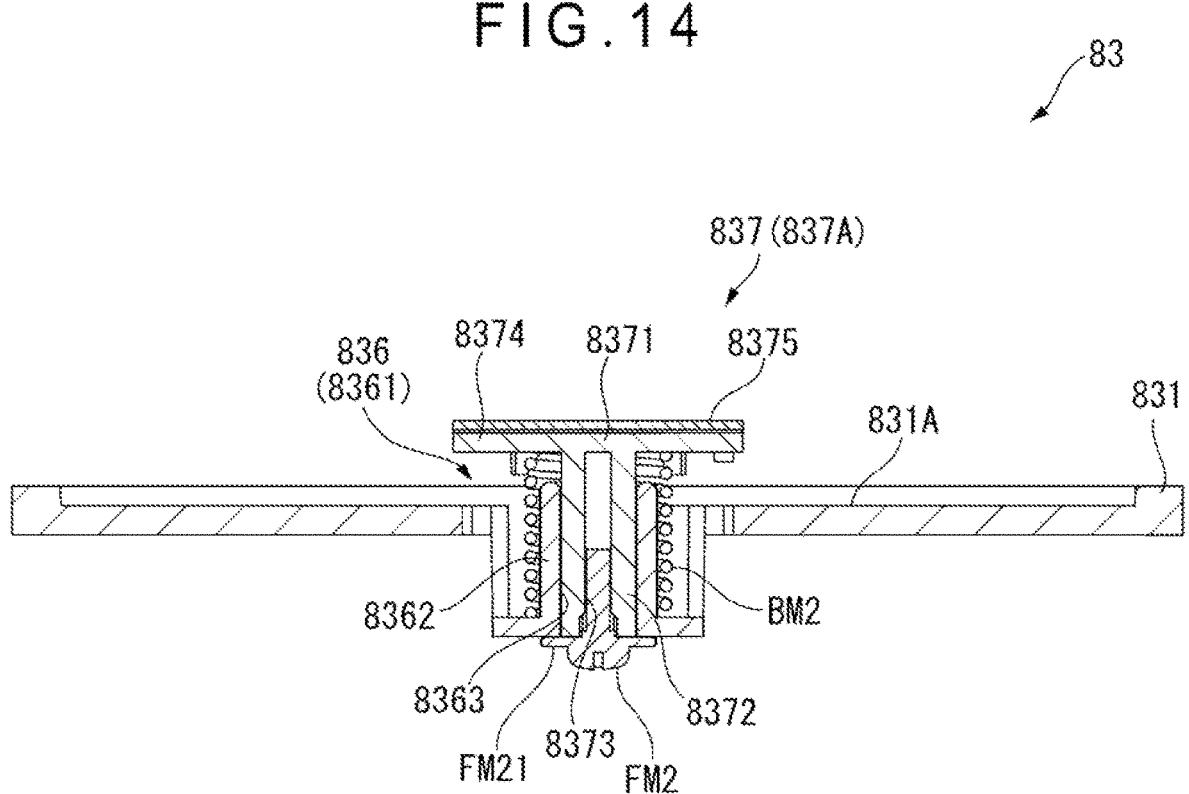
FIG. 14 is a cross sectional view of the braking pad disposed on the support base according to the exemplary embodiment.

FIG. 13 is a perspective view of the braking pad 837 separated from an arrangement base 836. FIG. 14 is a cross-sectional view of the braking pad 837 disposed on the arrangement base 836.

Three arrangement bases 836 are provided at regular intervals along the circumferential direction of the support base 831. The braking pad 837, a biasing member BM2, and a fixing member FM2 are arranged in each arrangement base 836. As shown in FIGS. 13 and 14, the arrangement bases 836 each include a recess 8361 that is recessed in the −Z direction from the surface 831A in the +Z direction of the support base 831, a boss 8362 standing on a bottom of the recess 8361 in the +Z direction, and a through hole 8363 penetrating the boss 8362 in the +Z direction.

In the recess 8361, the biasing member BM2 is provided around the boss 8362, as shown in FIG. 14. In the exemplary embodiment, a compression coil spring is used as the biasing member BM2.

A shaft 8372 of the braking pad 837 is inserted into the through hole 8363 from the +Z direction.

Structure of Braking Pad

The plurality of braking pads 837 (837A to 837C) correspond to a plurality of contact members brought into contact with the support portion 62 of the jog dial 6. A braking force acts on the support portion 62 by the braking pads 837, attenuating a rotation force of the jog dial 6. The braking pads 837 are disposed on the arrangement bases 836 corresponding thereto. Specifically, a total of three braking pads 837 are provided at regular intervals in the circumferential direction of the annular support base 831. In other words, the braking pads 837 include the braking pad 837A positioned in the +Y direction, the braking pad 837B positioned in −Y direction and the +X direction, and the braking pad 837C positioned in the −Y direction and the −X direction.

As shown in FIGS. 13 and 14, the braking pad 837 includes a pad body 8371 that is movable in the ±Z directions with respect to the support base 831, and a resistance member 8375 provided for the pad body 8371.

The pad body 8371, which is formed into a substantially T shape, includes the shaft 8372 extending in the +Z direction and a facing portion 8374 positioned at an end in the +Z direction of the shaft 8372.

As shown in FIG. 14, the shaft 8372 is inserted into the through hole 8363. A screw hole 8373 is formed in an end in the −Z direction of the shaft 8372. The fixing member FM2, which is a screw, is fitted into the screw hole 8373.

In the braking pad 837, the facing portion 8374 faces the support portion 62 of the jog dial 6. The resistance member 8375 is provided on a surface in the +Z direction of the facing portion 8374.

A braking force acts on the jog dial 6 by bringing the resistance members 8375 into contact with portions close to the outer edge of the support portion 62. That is, the resistance member 8375 is a member functioning as a resistance to the rotation of the jog dial 6. The resistance members 8375 are formed from felt in the exemplary embodiment, but not limited thereto. The resistance members 8375 may be formed from any other material.

As shown in FIG. 14, the braking pad 837 is displaceable in the −Z direction against the biasing force of the biasing member BM2. A head FM 21 of the fixing member FM 2 is larger in inner diameter than the through hole 8363. The fixing member FM 2 is a screw inserted from −Z direction into the screw hole 8373 of the braking pad 837. The braking pad 837 is thus movable in the +Z direction until the head FM 21 comes in contact with the arrangement base 836. In other words, movement in the +Z direction of the braking pad 837 by being biased by the biasing member BM2 in the +Z direction is restricted by bringing the head FM21 into contact with the arrangement base 836.

Figure 15:
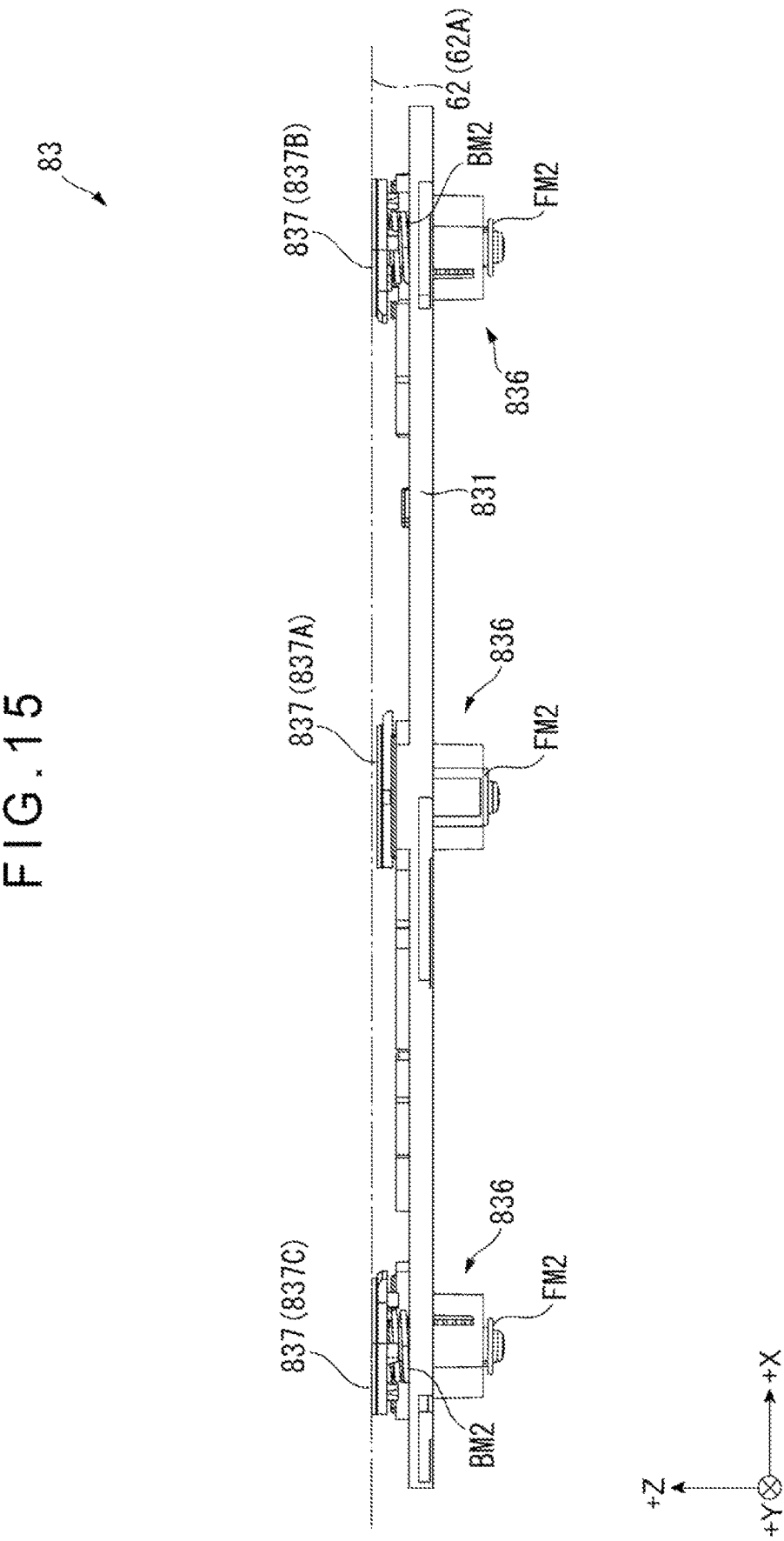
FIG. 15 is a side view of the braking unit according to the exemplary embodiment.

FIG. 15 is a side view of the braking unit 83 as viewed from the −Y direction.

As shown in FIG. 15, a dimension in the +Z direction from the support base 831 to an end in the +Z direction of the shaft 8372 of one of the three braking pads 837 is different from that of the remaining two of the three braking pads 837. In other words, the three braking pads 837 include a first braking pad as a first contact member and a second braking pad as a second contact member. The first and second braking pads have different dimensions in the +Z direction from the support base 831. That is, the shaft 8372 of the first braking pad is different in dimension in the +Z direction from the shaft 8372 of the second braking pad.

Of the three braking pads 837 in the exemplary embodiment, the braking pad 837A corresponds to the first contact member and the braking pads 837B, 837C correspond to the second contact member. The shaft 8372 of the braking pad 837A is smaller in dimension in the +Z direction than the shafts 8372 of the braking pads 837B, 837C. The ends in the −Z direction of the shafts 8372 of the respective braking pads 837 have the same position in the +Z direction. That is, a dimension in the +Z direction from the support base 831 to the end in the +Z direction of each of the braking pads 837B, 837C is larger than a dimension in the +Z direction from the support base 831 to the end in the +Z direction of the braking pad 837A. The ends in the +Z direction of the braking pads 837B, 837C are positioned in the +Z direction from the end in the +Z direction of the braking pad 837A.

In this structure, in a state where the braking pads 837B, 837C are in contact with the support portion 62 as shown in FIG. 15, a braking force acts on the jog dial 6 by the braking pads 837B, 837C. The braking pad 837A not in contact with the support portion 62 applies no braking force. From this state, when the support base 831 moves in the +Z direction (i.e., toward the support portion 62), the pressing force of the braking pads 837B, 837C against the support portion 62 provided by the biasing member BM2 is increased. Thus, the rotational resistance of the jog dial 6 is increased, and the braking force acting on the jog dial 6 is increased.

Further movement in the +Z direction of the support base 831 brings not only the braking pads 837B, 837C but also the braking pad 837A into contact with the support portion 62, resulting in a braking force on the jog dial 6 by the braking pads 837A, 837B, 837C. Thus, the rotational resistance of the jog dial 6 is further increased, and the braking force acting on the jog dial 6 is further increased.

Further movement in the +Z direction of the support base 831 increases the pressing force of the braking pads 837A, 837B, and 837C against the support portion 62 provided by the biasing member BM2. Thus, the rotational resistance of the jog dial 6 is much further increased, and the braking force acting on the jog dial 6 is much further increased.

Accordingly, the braking force acting on the jog dial 6 by each braking pad 837 depends on a contact state between the support portion 62 and each braking pad 837. The contact state of each braking pad 837 is adjusted by the position of the support base 831 relative to the support portion 62, that is, the position of the support base 831 in the +Z direction.

The position of the support base 831 in the +Z direction is adjusted by the adjuster 84.

Structure of Adjuster

Figure 16:
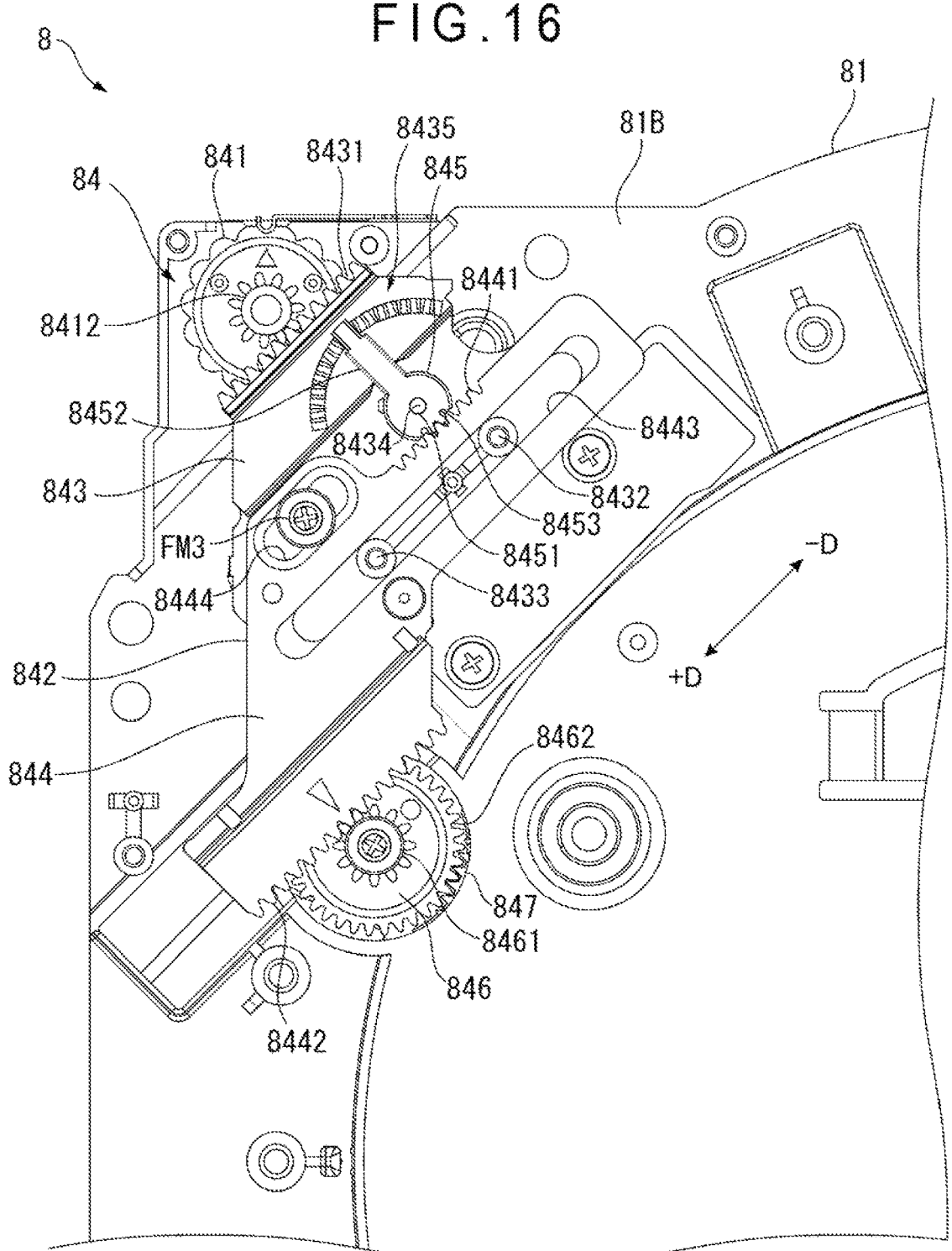
FIG. 16 shows an adjuster according to the exemplary embodiment.

FIG. 16 shows the adjuster 84 provided on a surface 81B in the −Z direction of the body 81, as viewed from the −Z direction.

As described above, the adjuster 84 adjusts the braking force acting on the jog dial 6 by adjusting the position of the support base 831 in the +Z direction and adjusting the number of the braking pads 837 brought into contact with the bottom surface 62A of the jog dial 6. The adjuster 84 includes a dial 841, a transmission member 842, and the gear 846 as shown in FIG. 16 as well as the rotational moving base 847 as shown in FIGS. 6 and 9.

Structure of Dial

The dial 841, the transmission member 842, and the gear 846 are covered, in the −Z direction, with a cover (not shown) provided for the surface 81B in the −Z direction of the body 81.

The dial 841 is rotatably provided in the body 81 with a rotational movement axis extending along the +Z direction as the center. The dial 841 includes a knob 8411 positioned in the +Z direction as shown in FIG. 2 and a meshing portion 8412 positioned in the −Z direction as shown in FIG. 16.

The knob 8411 is exposed on the top surface 41A of the casing 41, as shown in FIG. 1. The knob 8411, which is formed into a cylindrical shape, receives a rotating operation by an operator.

As shown in FIG. 16, the meshing portion 8412, which has a plurality of teeth along a circumferential direction centered on the rotational movement axis of the dial 841, meshes with the transmission member 842.

Structure of Transmission Member

The transmission member 842 meshes with the meshing portion 8412 and the gear 846, transmitting the rotation of the dial 841 to the gear 846. Specifically, the transmission member 842 moves in +D direction or −D direction depending on the rotational movement of the dial 841, thus rotating the gear 846. The +D direction is inclined to the +X direction and the +Y direction. The −D direction is an opposite direction of the +D direction.

Details of the transmission member 842 is described below.

Structure of Gear

The gear 846 is a two-stage gear including a first gear 8461 positioned in the −Z direction and a second gear 8462 positioned in the +Z direction.

The first gear 8461, which is formed into a cylindrical shape, includes a plurality of teeth meshing with the transmission member 842.

The second gear 8462 rotates coaxially with the first gear 8461. The second gear 8462, which is formed into a cylindrical shape, includes a plurality of teeth meshing with the rotationally moving base 847. The second gear 8462 is exposed on the inside of the guide rib 811 via the opening 8111 formed in the guide rib 811 of the body 81.

Structure of Rotationally Moving Base

Figure 17:
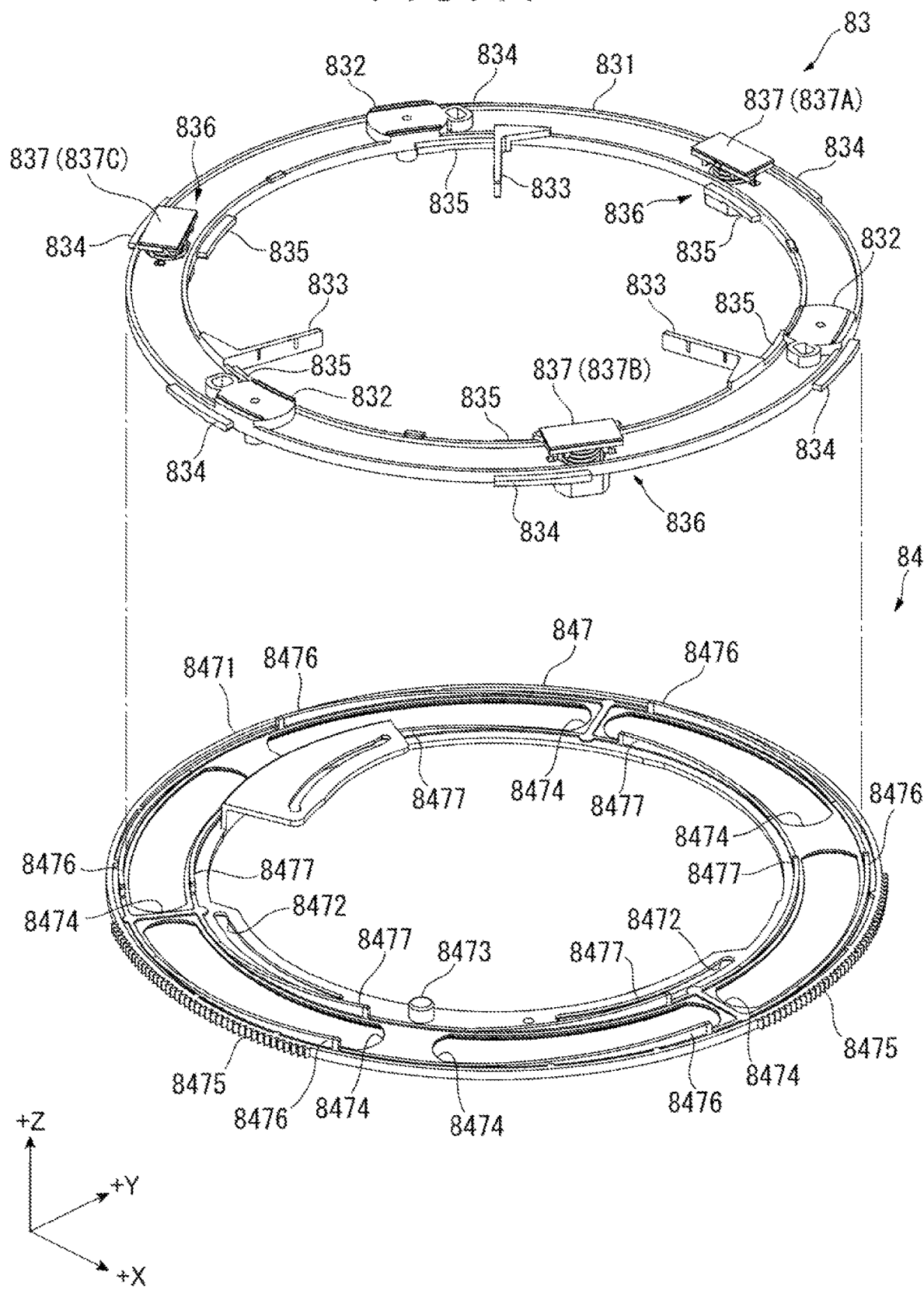
FIG. 17 is a perspective view of the braking unit and a rotationally moving base according to the exemplary embodiment.

FIG. 17 is a perspective view of the braking unit 83 and the rotationally moving base 847 separated from each other.

The rotationally moving base 847 is a rotationally moving body disposed inside the guide rib 811 between the support base 831 and the surface 81A of the body 81. The rotationally moving base 847 rotationally moves according to the rotation of the gear 846, thereby moving the support base 831 in the ±Z directions.

As shown in FIG. 17, the rotationally moving base 847 includes an annular body 8471, guide holes 8472 provided in the body 8471, a protrusion 8473, through openings 8474, meshing portions 8475, outside pushing-up portions 8476, and inside pushing-up portions 8477.

The body 8471 is formed into an annular shape. The body 8471 is slightly larger in outer diameter than the support base 831. Specifically, when the rotationally moving base 847 and the support base 831 are seen from the +Z direction, an outer edge of the rotationally moving base 847 is positioned radially outside an outer edge of the support base 831, and an inner edge of the rotationally moving base 847 is positioned radially inside an inner edge of the support base 831. A center portion of the rotationally moving base 847 overlaps in the +Z direction with a center portion of the support base 831.

Each guide hole 8472 is formed into an arc shape along an inner edge of the body 8471. Two guide holes 8472 are provided in the exemplary embodiment. The guide pins 815 (see FIG. 7) are inserted into the guide holes 8472. Accordingly, the rotational movement of the rotationally moving base 847 centered on a rotational movement axis passing through the center of the rotationally moving base 847 in the +Z direction is guided.

The protrusion 8473 is provided between the two guide holes 8472. The protrusion 8473 is brought into contact with a surface in the −Z direction of the support base 831.

Each through opening 8474 is an opening penetrating the body 8471 in the +Z direction. The body 8471 includes six through openings 8474. When the support base 831 is disposed on the rotationally moving base 847, the arrangement bases 836 are disposed in the through openings 8474 such that the fixing members FM2 are placed through the through openings 8474 from the −Z direction. The through opening 8474 is formed in such a dimension that an inner edge of the through opening 8474 does not interfere with the arrangement base 836 during the rotational movement of the rotationally moving base 847.

The meshing portions 8475, which are provided in an outer edge of the body 8471, mesh with the second gear 8462 of the gear 846. Although the two meshing portions 8475 are provided in the exemplary embodiment, a single meshing portion 8475 may be provided.

The plurality of outside pushing-up portions 8476 are provided at portions close to the outer edge of the body 8471 and the plurality of inside pushing-up portions 8477 are provided at portions close to the inner edge of the body 8471. In the exemplary embodiment, the outside pushing-up portions 8476 and the inside pushing-up portions 8477 are provided at every 60 degrees with respect to the center of the rotationally moving base 847. That is, six outside pushing-up portions 8476 are provided corresponding to the number of the outward protrusions 834 of the support base 831 and six inside pushing-up portions 8477 are provided corresponding to the number of the inward protrusions 835 of the support base 831.

The outside pushing-up portions 8476 and the inside pushing-up portions 8477 are protrusions of which protrusion amount in the +Z direction increases toward a counterclockwise direction as viewed from the +Z direction. The outside pushing-up portions 8476 are brought into contact with the outward protrusions 834 corresponding thereto, and the inside pushing-up portions 8477 are brought into contact with the inward protrusions 835 corresponding thereto.

When the gear 846 is rotated to rotationally move the rotationally moving base 847 in a clockwise direction as viewed from the +Z direction, the outside pushing-up portions 8476 and the inside pushing-up portions 8477 push the outward protrusions 834 and the inward protrusions 835 up in the +Z direction so as to push the support base 831 up in the +Z direction.

Accordingly, the rotation load on the jog dial 6 caused by the contact with the braking pads 837A to 837C and the pressing force by the braking pads 837A to 837C are increased, leading to increased braking force acting on the jog dial 6, as described above.

On the other hand, the support base 831 is biased in the −Z direction by the biasing member BM1. Thus, when the gear 846 is rotated in a direction reverse to the above to rotationally move the rotationally moving base 847 in the counterclockwise direction as viewed from the +Z direction, the outward protrusions 834 and the inward protrusions 835 move in the −Z direction along the outside pushing-up portions 8476 and the inside pushing-up portions 8477, moving the support base 831 in the −Z direction. Accordingly, the rotation load on the jog dial 6 caused by the contact with the braking pads 837A to 837C and the pressing force by the braking pads 837A to 837C are decreased, leading to decreased braking force acting on the jog dial 6.

That is, the rotating operation performed on the dial 841 rotationally moves the rotationally moving base 847 to move the support base 831 in the ±Z directions. Accordingly, the braking force acting on the jog dial 6 is adjusted.

Detailed Structure of Transmission Member

In view of user friendliness, the support base 831 and the rotationally moving base 847 are required to be arranged to allow predetermined braking force to act on the jog dial 6, for instance, before the jog controller 5 is shipped from the factory. For instance, the arrangement of the support base 831 and the rotationally moving base 847 is required to be calibrated so that the dial 841 is positioned at a center portion in a rotational movement range of the dial 841 and the rotationally moving base 847 is positioned at a center portion in a rotational movement range of the rotationally moving base 847.

In order to meet this requirement, the transmission member 842 of the adjuster 84 is configured to calibrate the position of the rotationally moving base 847 and the position of the support base 831 by rotationally moving the gear 846 without rotating the dial 841.

Specifically, the transmission member 842 includes a first meshing member 843, a second meshing member 844, and a pointer 845, as shown in FIG. 16.

Structure of First Meshing Member

The first meshing member 843 moves in the +D direction or −D direction according to the rotation of the dial 841. The first meshing member 843 is formed into a flat plate shape along the surface 81B. The first meshing member 843 includes a meshing portion 8431, guide pins 8432, 8433, a boss 8434, and a dial 8435.

The meshing portion 8431 includes a plurality of teeth, which are arranged linearly along the +D direction at an edge in the +Y direction of the first meshing member 843. The teeth of the meshing portion 8431 mesh with the meshing portion 8412 of the dial 841.

The guide pins 8432, 8433 and the boss 8434 cylindrically protrude from a surface in the −Z direction of the first meshing member 843. The guide pins 8432, 8433 are inserted into the second meshing member 844, and the boss 8434 is inserted into the pointer 845.

The dial 8435 indicates a rotational moving range of the pointer 845.

Structure of Second Meshing Member

The second meshing member 844 is fixed to the first meshing member 843 by a fixing member FM3 such as a screw. The second meshing member 844 includes meshing portions 8441, 8442, a guide hole 8443, and a long hole 8444.

The meshing portions 8441, 8442 each include a plurality of teeth arranged linearly along the +D direction. The meshing portion 8441 meshes with the pointer 845, and the meshing portion 8442 meshes with the gear 846.

The guide hole 8443 and the long hole 8444 are long holes that are long in the +D direction. The movement in the ±D directions of the second meshing member 844 is guided by inserting the guide pins 8432, 8433 into the guide hole 8443. The fixing member FM3 to be fixed to the first meshing member 843, such as a screw, is inserted into the long hole 8444.

Structure of Pointer

The pointer 845 includes a hole 8451, an operation unit 8452, and a meshing portion 8453.

The boss 8434 is inserted into the hole 8451. The pointer 845 is thus attached to the first meshing member 843 to be rotatably movable with a rotational movement axis extending along the +Z direction as the center.

The operation unit 8452 receives a rotationally moving operation performed on the pointer 845 by an operator.

The meshing portion 8453 meshes with the meshing portion 8441 of the second meshing member 844. The meshing portion 8453 is provided at a side opposite to the operation unit 8452 with respect to the hole 8451.

Calibration Using Transmission Member

When the second meshing member 844 is not fixed to the first meshing member 843, the second meshing member 844 is movable in the ±D directions independently of the first meshing member 843. Thus, when the pointer 845 is operated, the second meshing member 844 meshing with the gear 846 can move in the ±D directions independently of the dial 841 to rotate the gear 846. Therefore, the rotationally moving base 847 and the support base 831 can be arranged as described above.

Then, the dial 841 is disposed at the center portion in the rotational moving range of the dial 841, which is followed by fixing the second meshing member 844 to the first meshing member 843 with the fixing member FM3, making it possible to move the transmission member 842 in the ±D directions according to the rotationally moving operation performed on the dial 841. Accordingly, the braking force acting on the jog dial 6 is adjusted by moving the rotationally moving base 847 in the ±Z directions according to the rotationally moving direction and rotationally moving amount of the dial 841.

Effects of Exemplary Embodiment

The above-described playback system 1 according to the exemplary embodiment can provide effects as follows.

The DJ controller 4 (acoustic device) includes the jog controller 5. The jog controller 5 includes the jog dial 6 (rotary operator) and the base 8 supporting the jog dial 6 so that the jog dial 6 is rotatable. The base 8 includes the braking unit 83 brought into contact with the jog dial 6 to generate a braking force acting on the jog dial 6 and the adjuster 84 adjusting the braking force of the braking unit 83. The braking unit 83 includes the plurality of braking pads 837 (the plurality of contact members) brought into contact with the support portion 62 of the jog dial 6 to generate the braking force acting on the jog dial 6. The plurality of braking pads 837 apply different degrees of braking force depending on the adjustment amounts of the adjuster 84.

This structure allows the adjuster 84 to adjust the braking force acting on the jog dial 6. For instance, when the number of the braking pads 837 brought into contact with the jog dial 6 is small, the rotation load on the jog dial 6 is small and the braking force acting on the jog dial 6 is small. When the number of the braking pads 837 brought into contact with the jog dial 6 is large, the rotation load on the jog dial 6 is large and the braking force acting on the jog dial 6 is large. Accordingly, the above structure can adjust the braking force on the jog dial 6.

The braking unit 83 includes the plurality of braking pads 837 and the support base 831 moving in directions toward and away from the jog dial 6 (movable body moving in the ±Z directions). The plurality of braking pads 837 are each independently biased toward the jog dial 6 by the biasing member BM1.

In this structure, a state where the braking pads 837 are in contact with the jog dial 6 by the biasing members BM1 can be maintained.

Further, for instance, when the support base 831 moves in the +Z direction (toward the support member 62) with the braking pads 837B, 837C in contact with the support portion 62 of the jog dial 6, the biasing force by the biasing member BM1 increases. The pressing force against the support portion 62 by the braking pads 837B, 837C can thus be increased. Accordingly, the braking force on the jog dial 6 can be finely adjusted depending on the position of the support base 831 in the +Z direction. Furthermore, when the support base 831 moves in the +Z direction with the braking pads 837B, 837C in contact with the support portion 62, the braking pad 837A can be brought into contact with the support portion 62. The braking force on the jog dial 6 can be further increased. When the support base 831 in this state further moves in the +Z direction, the pressing force against the support portion 62 by the braking pads 837A to 837C can be increased. Accordingly, the braking force on the jog dial 6 can be finely adjusted.

The plurality of braking pads 837 include the braking pad 837A (first contact member) and the braking pads 837B, 837C (second contact member). In a dimension from the support base 831 in the +Z direction directed from the support base 831 toward the jog dial 6, the braking pad 837A is different from the braking pads 837B, 837C.

This structure makes it possible to change the number of the braking pads 837 brought into contact with the jog dial 6 by moving the support base 831 in the +Z direction or the −Z direction. Accordingly, the braking force acting on the jog dial 6 can be easily changed and adjusted.

The adjuster 84 includes the dial 841 for receiving an operator's rotating operation and the rotationally moving base 847, which is disposed between the surface 81A and the support base 831 in the base 8 and rotates according to the rotation of the dial 841 to move the support base 831 in the ±Z directions (toward and away from the jog dial 6).

With this structure, the rotationally moving base 847 can move the support base 831 in the ±Z directions through the rotational movement of the dial 841, thereby adjusting the braking force acting on the jog dial 6. The braking force can thus be adjusted easily.

The braking unit 83 includes the resistance members 8375 that are provided in the braking pads 837 to be brought into contact with the support portion 62 of the jog dial 6. The resistance members 8375 serve as the resistance to the rotation of the jog dial 6. As described above, felt is used for the resistance members 8375 in the exemplary embodiment.

In this structure, the resistance members 8375 can apply a load to the rotation of the jog dial 6. In addition to the above, the braking force acting on the jog dial 6 can be adjusted by using the resistance members 8375 having different frictional coefficients.

The braking unit 83 applies the braking force in the +Z direction directed from the base 8 toward the jog dial 6. That is, the braking force acts on the jog dial 6 by moving the plurality of braking pads 837 (the plurality of contact members) in the +Z direction and bringing the plurality of braking pads 837 into contact with the jog dial 6.

For instance, as compared to a structure in which a braking force acts on the jog dial 6 by holding the rotational movement axis of the jog dial 6, the above structure can downsize the jog controller 5 and reduce a static frictional force of the braking pads 837 on the jog dial 6. Thus, the above structure has enhanced operability of the jog dial 6.

The braking pads 837 are brought into contact with portions close to the outer edge of the support portion 62 of the jog dial 6.

In this structure, the rotation load on the jog dial 6 can be reduced compared to a case where the braking pads 837 are brought into contact with portions close to an inner circumference of the support portion 62. Thus, the braking force acting on the jog dial 6 can be set finely.

In the DJ controller 4, the jog controller 5 includes the display 7 provided in the base 8. The position in the base 8 where the display 7 is disposed is different from the position in the base 8 where the braking unit 83 is disposed. Specifically, as viewed from the +Z direction, the display 7 is disposed in the center of a space inside the guide rib 811 of the base 8, and the braking unit 83 is provided close to the outer circumference.

In this structure, the braking force can act on the jog dial 6 by the braking unit 83 without any interference between the braking unit 83 the display 7.

Modification(s) of Exemplary Embodiment

The invention is not limited to the above exemplary embodiment but includes any modification, improvements, and the like as long as an object of the invention can be achieved.

In the above exemplary embodiment, when the rotationally moving base 847 is rotationally moved with the braking pads 837B, 837C in contact with the support portion 62 of the jog dial 6 to move the support base 831 in the +Z direction, the braking pad 837A is brought into contact with the support portion 62. The invention, however, is not limited thereto and may adopt the following structure. When the support base 831 is moved in the +Z direction with one of the braking pads 837 in contact with the jog dial 6, the remaining other braking pads 837 are brought into contact with the jog dial 6. In this structure, the braking pads 837 may be brought into contact with the jog dial 6 one by one as the support base 831 moves in the +Z direction. That is, the braking pads 837 may be brought into contact with the jog dial 6 one by one as the support base 831 moves in the +Z direction.

In the above exemplary embodiment, the number of braking pads 837 is three. Two or four or more braking pads 837, however, may be provided.

In the exemplary embodiment, the braking pads 837 are supported by the support base 831, which is a movable body formed annularly as viewed from the +Z direction. The invention, however, is not limited thereto. The support base 831 is not indispensable as long as the braking pads 837 are adjustably positioned relative to the jog dial 6. Further, the support base 831 may have any other shape, such as a circular shape or rectangular shape.

Furthermore, each braking pad 837 is biased toward the jog dial 6 by the biasing member BM2. The invention, however, is not limited thereto. The biasing member BM2 is not indispensable as long as a state where the braking pad 837 is in contact with the jog dial 6 can be maintained.

Moreover, each biasing member BM2 is a compression coil spring in the above exemplary embodiment. The invention, however, is not limited thereto. Any other biasing member that can bias the braking pad 837 toward the jog dial 6 may be used.

In the exemplary embodiment, the dimension in the +Z direction of the shaft 8372 of the braking pad 837A is smaller than the dimension in the +Z direction of the shafts 8372 of the braking pads 837B, 837C. The invention, however, is not limited thereto. The shafts 8372 of the braking pads 837A, 837B, and 837C may have the same dimension in the +Z direction. In this case, the bosses 8362 having the through holes 8363 into which the respective shafts 8372 are inserted may have different dimensions in the +Z direction. Even in this case, it is possible to make the dimension from the support base 831 in the +Z direction of one of the braking pads 837 different from the dimension from the support base 831 in the +Z direction of the other braking pads 837. That is, any structure may be adopted as long as the degree of the braking force acting on the jog dial 6 is adjusted by bringing at least one of the braking pads 837A, 837B, and 837C into contact with the support portion 62 of the jog dial 6 with a time difference from the other braking pads according to the adjustment amount by the adjuster 84.

In the exemplary embodiment, the adjuster 84 includes the dial 841 by which the rotationally moving base 847 is rotationally moved to move the support base 831 in the ±Z directions. The invention, however, is not limited thereto. A driving device configured to rotate the rotationally moving base 847, such as a motor, may be provided. The driving device may be driven in response to an input operation performed on a button or the like.

Alternatively, it is not indispensable for the adjuster 84 to include the rotationally moving base 847. The adjuster 84 may include any other component that can move the support base 831 in the ±Z directions. That is, the adjuster 84 may include a component that can directly move the support base 831 in the ±Z directions.

In the exemplary embodiment, the resistance member 8375 formed from felt is provided in the braking pad 837 to be brought into contact with the jog dial 6. The invention, however, is not limited thereto. The resistance member is not indispensable. Further, the resistance member 8375 may be formed from any other material than felt.

In the above exemplary embodiment, the braking force in the +Z direction acts on the jog dial 6 by bringing the braking pads 837 into contact with the jog dial 6 from the −Z direction. The invention, however, is not limited thereto. A direction in which the braking force acts on the jog dial 6 by the braking unit 83 may be any other direction. For instance, the braking unit 83 may apply, to the support portion 62 of the jog dial 6, a braking force in the −Z direction or a braking force from the outside to the inside in the radial direction of the jog dial 6.

In the exemplary embodiment, the braking pads 837 are brought into contact with the bottom surface 62A of the support portion 62 of the jog dial 6 at portions close to the outer edge of the bottom surface 62A that is a surface in the −Z direction. The invention, however, is not limited thereto. The braking pads 837 may be brought into contact with a center portion of the bottom surface 62A or any other portion of the jog dial 6.

In the above exemplary embodiment, the display 7 is provided in a center portion of the jog dial 6 as viewed from the +Z direction. The invention, however, is not limited thereto. The display 7 may be provided in any other part of the jog dial 6 or is not indispensable.

In the above exemplary embodiment, an acoustic device provided with the jog controller 5 is exemplified by the DJ controller 4 shown in FIG. 1. The structure of the acoustic device, however, is not limited to the structure and the layout shown in FIG. 1. For instance, the acoustic device may include any one of the left deck 43L and right deck 43R, or the acoustic device may include only the jog controller 5.

The invention claimed is:

1. An acoustic device comprising:
    a rotary operator; and
    a base supporting the rotary operator so that the rotary operator is rotatable,
    the base comprising:
        a braking unit configured to be brought into contact with the rotary operator to cause a braking force to act on the rotary operator; and
        an adjuster configured to adjust the braking force caused by the braking unit,
    the braking unit comprising:
        a plurality of contact members configured to be brought into contact with the rotary operator to cause the braking force to act on the rotary operator; and
        a movable body provided with the plurality of contact members and configured to move in directions toward and away from the rotary operator,
    wherein
    the adjuster moves the movable body in the directions toward and away from the rotary operator, and
    the plurality of contact members are each independently biased toward the rotary operator, and the braking force acting on the rotary operator by the plurality of contact members varies depending on an adjustment amount by the adjuster.

2. The acoustic device according to claim 1, wherein the plurality of contact members comprise a first contact member and a second contact member, and
    in a direction directed from the movable body toward the rotary operator, a dimension from the movable body of the first contact member is different from a dimension from the movable body of the second contact member.

3. The acoustic device according to claim 1, wherein the adjuster comprises:
    a dial through which a rotating operation is received; and
    a rotationally moving body disposed between the base and the movable body and configured to be rotationally moved according to rotation of the dial so as to move the movable body in the directions toward and away from the rotary operator.

4. The acoustic device according to claim 1, wherein the braking unit comprises a resistance member, which is provided at a part of each of the contact members brought into contact with the rotary operator and is configured to function as a resistance to rotation of the rotary operator.

5. The acoustic device according to claim 1, wherein the braking unit causes the braking force to act in a direction directed from the base toward the rotary operator.

6. The acoustic device according to claim 1, wherein the plurality of contact members are configured to be brought into contact with portions close to an outer edge of the rotation operating unit.

7. The acoustic device according to claim 1, further comprising
    a display disposed in the base at a position different from a position where the braking unit is disposed in the base.

\* \* \* \* \*